US010809958B2

(12) United States Patent
Baer et al.

(10) Patent No.: US 10,809,958 B2
(45) Date of Patent: Oct. 20, 2020

(54) SETTING UP MULTIPLE DISPLAYS VIA USER INPUT

(71) Applicant: Microsoft Technology Licensing, LLC, Redmond, WA (US)

(72) Inventors: Matthias Baer, Seattle, WA (US); Tyler White, Seattle, WA (US); Craig Thomas McIntyre, Kirkland, WA (US); Gargee Sharma, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/990,563

(22) Filed: May 25, 2018

(65) Prior Publication Data
US 2019/0317719 A1    Oct. 17, 2019

Related U.S. Application Data

(60) Provisional application No. 62/658,556, filed on Apr. 16, 2018.

(51) Int. Cl.
*G06F 3/048* (2013.01)
*G06F 3/14* (2006.01)
(Continued)

(52) U.S. Cl.
CPC ............ *G06F 3/1423* (2013.01); *G06F 3/011* (2013.01); *G06F 3/017* (2013.01); *G06F 3/0412* (2013.01); *G06F 3/04812* (2013.01); *G06F 3/167* (2013.01)

(58) Field of Classification Search
CPC ............... G06F 3/0482; G06F 9/453; G06F 2203/04803; G06F 3/011; G06F 3/017;
(Continued)

(56) References Cited

U.S. PATENT DOCUMENTS 5,923,307 A * 7/1999 Hogle, IV ........... G06F 3/04897
345/1.3
9,304,732 B2  4/2016 Park et al.
(Continued)

FOREIGN PATENT DOCUMENTS

CN          105292504 A      2/2016

OTHER PUBLICATIONS

"International Search Report and Written Opinion Issued in PCT Application No. PCT/US19/025265", dated Jun. 19, 2019, 12 Pages.

*Primary Examiner* — Claudia Dragoescu
(74) *Attorney, Agent, or Firm* — Newport IP, LLC; Michael C. Johnson

(57) ABSTRACT

Techniques are disclosed for configuring a group of displays. A grouping of display devices that are to be combined to form an integrated display is identified. A prompt is generated for user input indicative of a spatial arrangement of the display devices. In response to the prompt, a series of user inputs is received by one or more input sensors. Based on the series of user inputs, the spatial arrangement of the display devices is estimated. Based on the estimated spatial arrangement of the display devices, portions of display data are mapped to the display devices. The mapped portions of the display data are rendered on the display devices to form an integrated display.

20 Claims, 23 Drawing Sheets

(51) Int. Cl.
  *G06F 3/041* (2006.01)
  *G06F 3/01* (2006.01)
  *G06F 3/16* (2006.01)
  *G06F 3/0481* (2013.01)

(58) Field of Classification Search
  CPC .............. G06F 3/011012; G06F 3/013; G06F 3/04842; G06F 3/04886; G06F 3/0167; G06F 3/0412; G06F 3/04812; G06F 3/1423
  See application file for complete search history.

(56) References Cited

U.S. PATENT DOCUMENTS

| | | |
|---|---|---|
| 9,489,216 B2 | 11/2016 | Walter et al. |
| 2003/0189597 A1* | 10/2003 | Anderson .............. G06F 3/0481 715/778 |
| 2007/0001927 A1 | 1/2007 | Ricks et al. |
| 2009/0135194 A1 | 5/2009 | Keuenhof |
| 2010/0141552 A1 | 6/2010 | Ferlitsch et al. |
| 2010/0293501 A1 | 11/2010 | Russ et al. |
| 2012/0249415 A1 | 10/2012 | Nakajima et al. |
| 2013/0176255 A1 | 7/2013 | Kim et al. |
| 2015/0363154 A1* | 12/2015 | Frederick ............... G08C 17/02 345/1.3 |
| 2017/0060319 A1 | 3/2017 | Seo et al. |
| 2017/0344171 A1* | 11/2017 | Qiao ..................... G06F 3/0416 |
| 2018/0150204 A1* | 5/2018 | Macgillivray .......... G06F 3/012 |

* cited by examiner

SETTING UP MULTIPLE DISPLAYS VIA USER INPUT

CROSS-REFERENCE TO RELATED APPLICATIONS

This application claims priority under 35 U.S.C. § 119(e) to U.S. Provisional Patent Application No. 62/658,556, filed on Apr. 16, 2018 and titled "SETTING UP MULTIPLE DISPLAYS VIA USER INPUT," the entire disclosure of which is expressly incorporated in its entirety by reference herein.

BACKGROUND

Display monitors are used in a variety of applications such as personal computing, advertising, entertainment, and providing public information. Many computers have a display controller that can configure and use two or more displays. For example, when two displays are used with a computer, the two displays can typically be connected to the computer directly using two video cables (e.g., VGA, DisplayPort, or HDMI). The computer may use a user interface to allow a user to designate which of the two displays is placed on the left side and which of the two displays is placed on the right side so that images can be correctly shown on the two displays. When three displays are used, the computer may use the user interface to allow the user to designate which of the three displays is placed on the left side, which of the three displays is placed at the center, and which of the three displays is placed on the right side so that images can be correctly shown on the three displays.

It is possible to connect multiple types of display devices such as televisions, computer monitors, wearable displays, projectors or any other display device, or a combination thereof, to a computer and set up configuration information. However, configuration of multiple display devices is typically performed through a menu interface that is often complex and may be difficult for inexperienced users. It may also be difficult in some cases to connect the display devices to a computer, such as when the displays are wall-mounted or are installed in way that is difficult to physically access the display ports.

A computer may automatically detect when it has been connected to a new display device. However, the computer does not know where the display device is physically located in relation to any other display devices, and the user must use the menu interface in order to enter this information. This may be inconvenient and may also be more difficult for some users. The computer device will also not detect any subsequent changes in relative positions of the display devices, which must be input manually.

When the spatial layout of a group of displays is not known to a computer, rendered information may appear on any one of the displays and may not appear on a display or in the order that the user wishes, or may otherwise display content incorrectly. It must then be moved or, in the case of some applications, the application and display devices must be configured through further menu interfaces to ensure that the particular application image appears on the correct display device.

Additionally, even if the user is able to enter the desired configuration information, the user may have to evaluate whether the resulting configuration is as intended. Otherwise, the configuration may revert to a previous configuration, and the user will have to repeat the configuration procedure. This process can be time consuming and waste resources such as power, network bandwidth, and processing capacity.

It is with respect to these and other considerations that the disclosure made herein is presented.

SUMMARY

The disclosed embodiments describe technologies for efficiently and easily configuring a computing environment that includes the use of multiple display devices. Methods and systems are described that provide improvements and efficiencies when obtaining user input in order to determine the physical arrangement of the displays and determine how portions of display data is rendered within the determined arrangement. In various embodiments, a user input may include a touch gesture, a voice input, a motion gesture, or other forms of user input suitable for indicating an arrangement of display devices. Such forms of user input can be used to configure one or more displays in a way that overcomes the issues noted above. For instance, such forms of user input can easily provide configuration information and allow the user to quickly see the results of the configuration decisions. As described below, the techniques disclosed herein allow a computer to efficiently determine a desired display configuration with reduced processing and other computing resources. For example, presentation of selectable configuration options and efficient use of sensor inputs for easy selection can allow for reduced processing loads and as well as reduced configuration data that must be generated, maintained, and stored. Additionally, the efficient presentation and easy selection of configuration options can enable users to experience a reduction of configuration time and resource usage as well as avoid repeated attempts to configure and verify display configurations.

In one example, a visual, audio, or other prompt may be generated to prompt a user to identify each of a set of displays in a specified order so that the intended display arrangement and ordering can be determined and stored. The user may provide the requested input by touch, voice, motion/gesture, or other means. The user input may be provided in a way that reduces the amount and complexity of user interactions with the displays. For example, the user may touch each display if the displays have a touch sensitive surface. The user may also use gestures if a camera system is available on a display, or provide voice prompts if voice/speech recognition is available on a display. Other means of providing user input may be employed.

Simplifications and assumptions may be made to minimize the amount of user input data that is needed. For example, if the displays have the means to determine their orientation through the use of on-device sensors, then this information may be utilized to reduce the amount of information that is presented to the user for confirmation. Furthermore, if the displays have sensors that can detect their proximity and alignment relative to one another, then the alignment between displays may be determined and presented to the user for confirmation. Once the user input is saved, the configuration information may be maintained and used by the system until the user changes the configuration.

In the examples presented herein, the disclosed techniques are described with reference to display monitors for the sake of simplicity. However, the techniques may be applied to determine spatial orientation of other devices such as Internet of Things (IoT) devices (e.g., clocks, lights, voice activated controllers, and speakers). Additionally, the disclosed techniques can be used in conjunction with any type of display including virtual reality goggles and heads-up displays. For example, a heads-up display that only covers a partial field of view may be incorporated to provide an integrated display experience along with large screen displays.

Many display controllers are designed to accommodate a variety of heterogeneous displays and therefore are complicated in their menus and possible configurations. However, when situations are relatively more simple, such as in the case of four homogeneous displays that have limited orientation possibilities, display configuration interfaces can be overly complicated and cumbersome for what should be a quick and easy setup. Furthermore, when the setup environment lacks the ability to connect a precision pointing device such as a mouse, but the display configuration interface presented to the user assumes access to a precision pointing device, the user may have difficulty using the interface and providing the requested information. Additionally, if the displays are wall-mounted, it would be cumbersome to require the attachment of a mouse and another computer to the displays to complete the setup.

In an embodiment, instead of a setup screen that requires precise placement of objects on a screen to represent a display arrangement, a wizard is provided that utilizes available input sensors such as the touch screen on the individual devices to receive user inputs and determine an ordering or arrangement of the displays. As described herein, the wizard may be referred to as a spatial configurator. Because the spatial configurator is not constrained to one interface on a single screen, the spatial configurator can provide a more intuitive input environment that is appropriate for the specific display device and device layout.

In some embodiments, the spatial configurator may perform a best fit of the user input to determine the arrangement of the display devices. For example, the range of possible configurations may be limited to those that are likely based on the available information. For example, the set of possible form factors for the display devices may be restricted, allowing for an intelligent set of alignment and orientation options that the user can select. This can reduce the number of ways that the user can set up an incorrect configuration.

The spatial configurator may incorporate capabilities of the available sensors to provide the inputs for determining the spatial arrangement. For example, if one or more displays have a microphone or a microphone is coupled to the spatial configurator, the spatial configurator may request voice inputs to confirm information for determining the arrangement.

If one or more displays have a camera or other capability to detect movement or gestures of a user, then the spatial configurator may prompt for user gestures to confirm information for determining the arrangement. The camera may use eye tracking, identification of where the user is standing in relation to the camera or display, the direction from which the user is speaking, or a wave or other gesture of the user. For example, the spatial configurator may render text on one or more displays such as: "is this display 1 or 2?" or "say yes when this display indicates the desired display position (1, 2, 3, or 4)." The individual displays may render identifiers for the user to identify each display, such as a number, shape, color, or other visual means of identification. Alternatively, the user may sequentially touch the monitors in an order, perform a user gesture (e.g., pointing) in a desired sequence, or perform a motion to indicate the order (e.g., an arm motion that moves left-to-right indicating the desired ordering). A motion detector can also be used to determine the proximity of a user to a particular display. The spatial configurator may determine the available sensors and ascertain efficient ways to determine data indicative of directionality as well as identification of individual displays.

In another example, alignment of displays may be confirmed by rendering alignment markers on the displays, and asking the user to indicate when the alignment markers are aligned. The user may respond to prompts to indicate a "yes" or "no" as the markers are moved relative to one another, or on touch-enabled displays, the user can touch the screen to indicate where the markers are aligned.

In some embodiments, the spatial configurator may allow the creation of subgroupings of displays. For example, a set of four displays may be grouped into two subgroups of two displays each. The spatial configurator may thus allow the user to identify the number of groupings, and then to identify the spatial arrangement of each of the groups. This may be done by prompting the user to identify a number of groupings. The user may then be prompted to input the arrangement of displays in each grouping, using the techniques disclosed herein. Alternatively, the user may be allowed to define an ordering and provide an indication that the current display is the last one of a group. For example, the user may double-tap or enter some other indication that the current display is the last one of the group. If the spatial configurator knows that there are other displays that have been identified but have not be placed into a known arrangement, the spatial configurator may prompt the user at that time as to whether the additional displays will be part of a second subgrouping. Other methods are also contemplated, such as prompting the user after each display is identified as to whether there are additional displays to add to the grouping.

In some embodiments, a subgrouping may have only one display, such as a projector that may be treated as having its own display properties.

Some display devices may not have a direct means of input, such as a projector. In such cases, the user may be prompted to identify an ordering for the projector on another display device that is capable of receiving user inputs.

In the case of a set of arranged displays, once the spatial arrangement is known, the boundaries of the integrated display may be determined and graphics generation functions may determine a display canvas for graphics that are to be generated for the integrated display. For example, the overall display canvas may be segmented into a number of display portions based on the number of available displays.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

The following Detailed Description describes technologies for efficiently and easily configuring a computing environment that includes multiple displays or other devices which can be set up in multiple configurations. The disclosed techniques provide improvements and efficiencies when obtaining user input in order to determine the physical arrangement of the displays and other devices, and determine the ordering of the displays and other devices within this physical arrangement. The user can easily provide configuration information and quickly view and confirm the configuration, allowing for a more accurate configuration, more efficient use of computing resources, and a reduction of configuration time and resource usage.

Figure 1A:
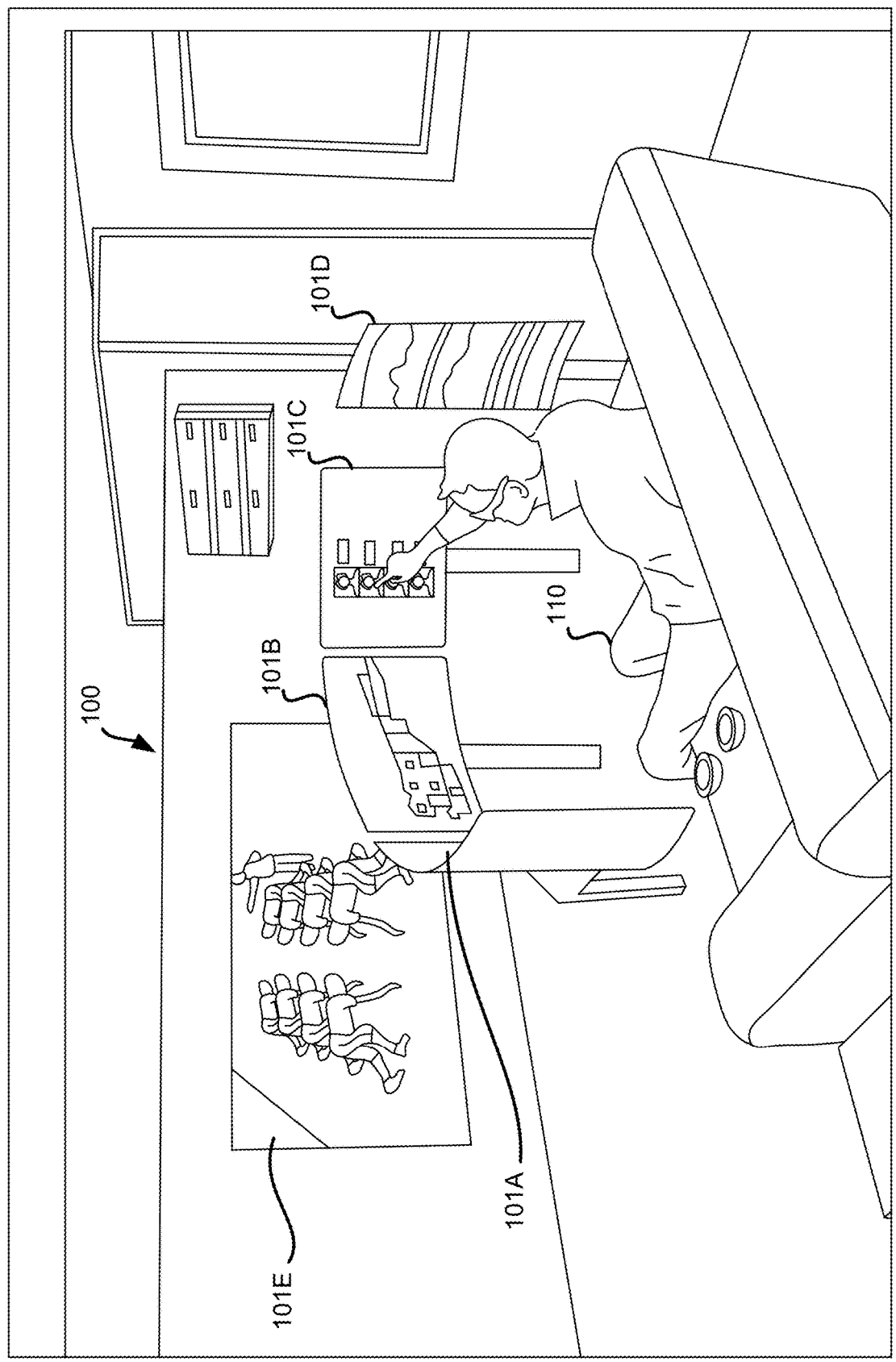
FIG. 1A is a diagram illustrating a computing environment for configuring displays in accordance with the present disclosure.

Referring to FIG. 1A, illustrated is an example computing environment 100 that includes displays 101A, 101B, 101C, 101D, and 101E. As discussed, the disclosed examples are described with reference to displays. However, the disclosed techniques may be applied to other types of devices that can be spatially arranged. FIG. 1A illustrates a user 110 who is interacting with the displays 101A, 101B, 101C, 101D, and 101E to configure the displays to operate in the computing environment 100. FIG. 1A depicts displays 101A, 101B, 101C, and 101D being situated side-by-side in a horizontal configuration. Display 101E is physically separated from displays 101A, 101B, 101C, and 101D. As can be seen from FIG. 1A, it would be efficient to allow user 110 to configure displays 101A, 101B, 101C, and 101D by quickly touching these displays in the desired order rather than proceeding through a multi-step process with multiple windows. It would also be efficient to allow user 110 to configure display 101E by using a voice prompt or a gesture prompt rather than interacting with multiple menu items through a display window.

In various embodiments, a visual, audio, or other prompt may be generated to prompt the user to identify each of a set of displays in a specified order so that the intended display arrangement and ordering can be determined and stored. The user may provide the requested input by touch, voice, motion, gesture, or other means. The user input may be input using various input sensors such as a touchscreen display, a camera system, a voice or speech activated sensor, motion detector, and the like.

In an embodiment, instead of a setup screen that requires precise placement of objects on a screen to represent a display arrangement, a wizard is provided that utilizes available input sensors such as the touch screen on the devices to receive user inputs and determine an ordering or arrangement of the displays. As described herein, the wizard may be referred to as a spatial configurator. Because the spatial configurator is not constrained to one interface on a single screen, the spatial configurator can provide a more intuitive input environment that is appropriate for the specific device and device layout.

Figure 1B:
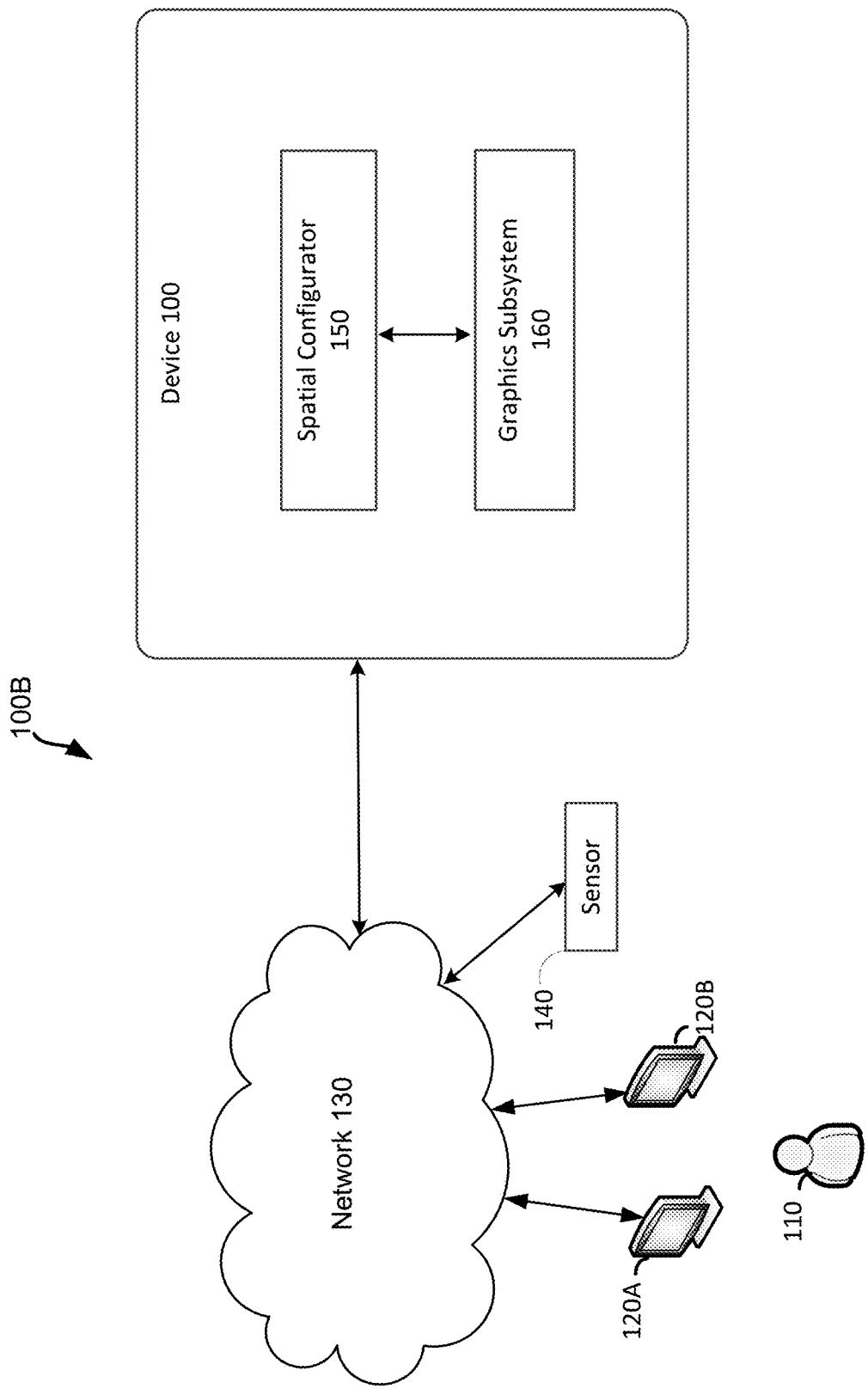
FIG. 1B is a diagram illustrating a computing environment for configuring displays in accordance with the present disclosure.

FIG. 1B illustrates an example computing environment 100B in which the embodiments described herein may be implemented. FIG. 1B is a diagram schematically illustrating an example of a device 100 that can provide the described computing functionality. Device 100 may be part of a display or can be another device configured to provide the described functionality. Illustrated in FIG. 1B are one or more users 110 (which may be referred to herein singularly as "a user 110" or in the plural as "the users 110"). Also illustrated are displays 120A and 120B (which may be referred to herein singularly as "a display 120" or in the plural as "the displays 120") via a network 130. The computing functionality provided by device 100 may include various types of functions such as spatial configurator 150 and graphics subsystem 160.

Network 130 may, for example, be a publicly accessible network of linked networks and possibly operated by various distinct parties, such as the Internet. In other embodiments, network 130 may be a private network, such as, for example, a corporate network that is wholly or partially inaccessible to non-privileged users. In other embodiments, network 130 may include one or more private networks with access to and/or from the Internet. If implemented locally, network 130 may be a local network of connected devices such as a group of displays connected to a single computing device via direct video and data connections such as HDMI and USB.

Displays 120 may be any type of display accessible to users 110. For instance, displays 120 may be a wall-mounted monitor, a desktop monitor, a television, a tablet, or any other device capable of providing user interfaces to users 110 and communicating with device 100. Although only two displays 120 are depicted, it should be appreciated that there may be multiple user displays.

FIG. 1B illustrates sensors 140 (which may be referred to herein singularly as "a sensor 140" or in the plural as "the sensors 140") which may include sensors such as a touch-sensitive display, voice or text recognition system, a camera system, gesture or motion detector, and the like. Spatial configurator 150 may be configured to configure aspects of the displays 120 and how they are utilized for rendering graphics by graphics subsystem 160. In this regard, spatial configurator 150 might provide a graphical interface via displays 120 to prompt the users 110 to provide inputs that identify the ordering of the displays 120. The prompts may be provided directly on the displays 120. Additionally or alternatively to prompts on the displays 120, audio prompts may be provided on audio speakers (not shown on FIG. 1B) which may be physically integrated on the displays 120 or on separate audio speakers.

It should be appreciated that although the embodiments disclosed herein show spatial configurator 150 as a function executing on one device, spatial configurator 150 may be installed and executed on one or more of the displays 120 or a separate computing device. Spatial configurator 150 may also execute remotely via network 130. It should be appreciated that, for the sake of simplicity, various aspects of the computing systems and other devices in this example are illustrated without showing certain conventional details. Additional computing systems and other devices may be interconnected in other embodiments and may be interconnected in different ways. The network topology illustrated in FIG. 1B has been greatly simplified and that many more networks and devices may be utilized to interconnect the various computing systems disclosed herein. These network topologies and devices should be apparent to those skilled in the art.

It should also be appreciated that the configuration depicted in FIG. 1B is merely illustrative and that other implementations might be utilized. Additionally, it should be appreciated that the functionality disclosed herein might be implemented in software, hardware or a combination of software and hardware. Other implementations should be apparent to those skilled in the art. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 2:
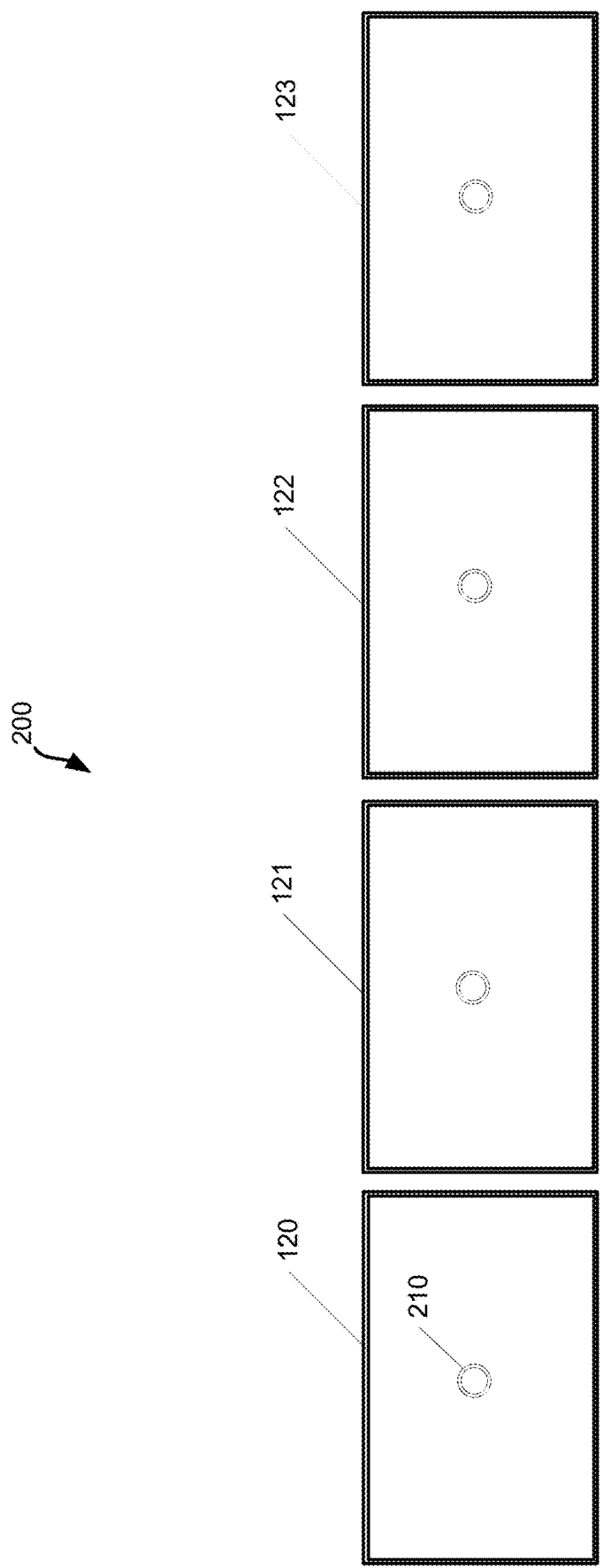
FIG. 2 is a diagram illustrating configuration of displays in accordance with the present disclosure.

Referring to FIG. 2, illustrated is an example computing environment 200 that includes an example arrangement of four displays 120, 121, 122, and 123 that are arranged in a horizontal alignment. In an embodiment, the displays 120, 121, 122, and 123 may have touch-sensitive screens. Spatial configurator 150 may be configured to provide a graphical interface via displays 120, 121, 122, and 123 to prompt the users 110 to provide inputs that identify the ordering of the displays 120, 121, 122, and 123. The prompts may be provided directly on the displays 120, 121, 122, and 123. In this example, displays 120, 121, 122, and 123 may have a marker 210 that indicates to the user 110 that the displays 120, 121, 122, and 123 may be touched in the display order that the user wishes to assign to the individual displays. Additionally or alternatively to prompts on the displays 120, 121, 122, and 123, audio prompts may be provided on audio speakers (not shown on FIG. 2) which may be physically integrated on the displays 120 or on the separate audio speakers.

Figure 3:
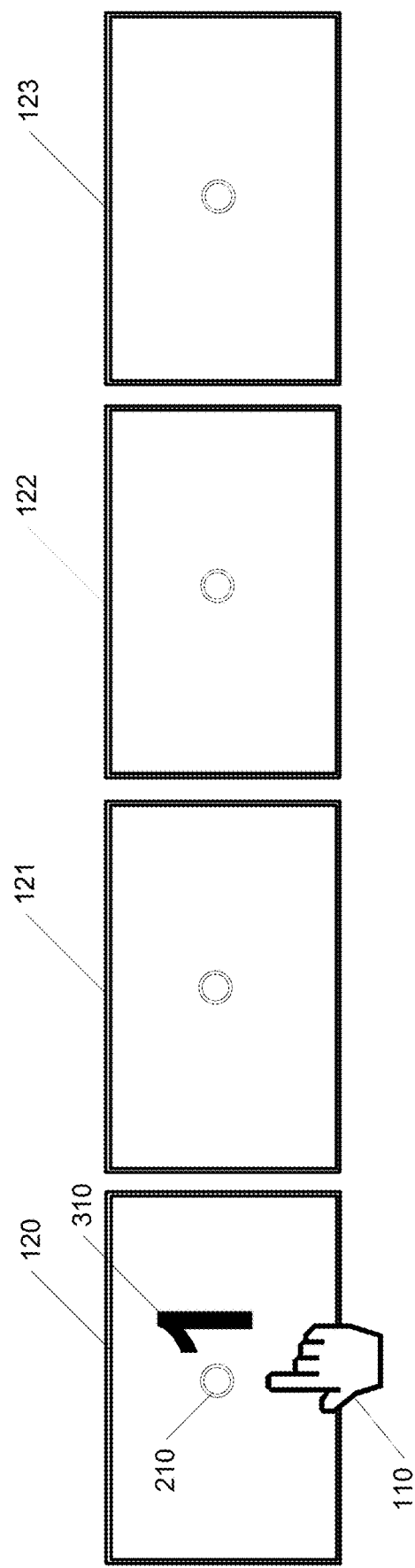
FIG. 3 is a diagram illustrating configuration of displays in accordance with the present disclosure.

Referring to FIG. 3, after the user 110 touches the first of the displays 120, a "1" 310 is rendered on the screen of the first display to indicate that this is the first display in the set of displays. The user 110 may then move on to the second display.

Figure 4:
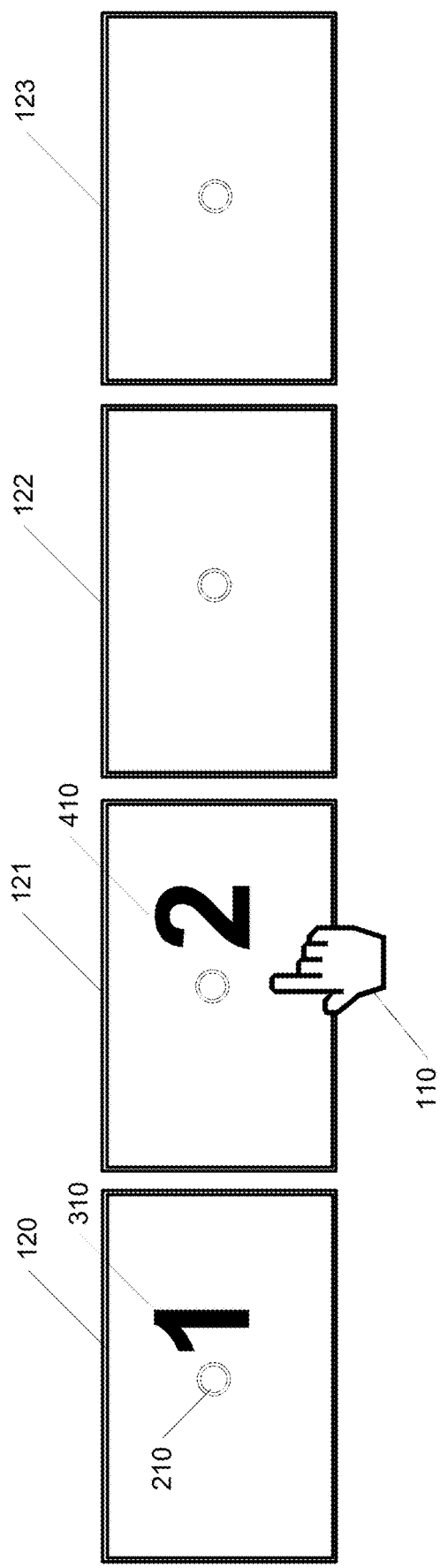
FIG. 4 is a diagram illustrating configuration of displays in accordance with the present disclosure.

Referring to FIG. 4, after the user 110 touches the second of the displays 121, a "2" 410 is rendered on the screen of the second display to indicate that this is the second display in the set of displays. The user 110 may then move on to the third display.

Figure 5:
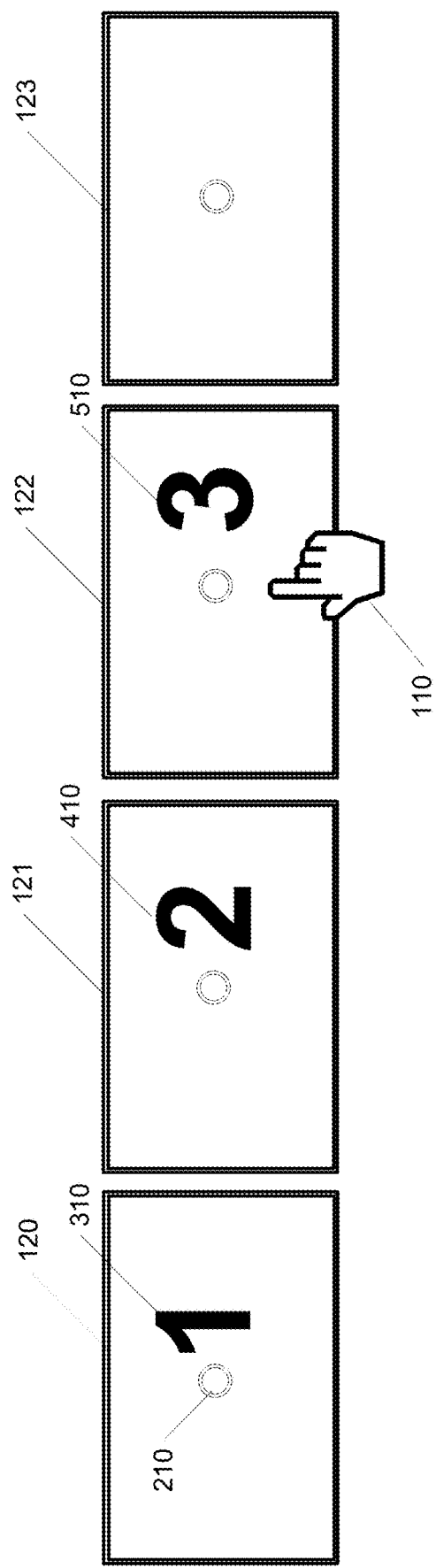
FIG. 5 is a diagram illustrating configuration of displays in accordance with the present disclosure.

Referring to FIG. 5, after the user 110 touches the third of the displays 122, a "3" 510 is rendered on the screen of the third display to indicate that this is the third display in the set of displays. The user 110 may then move on to the fourth display.

Figure 6:
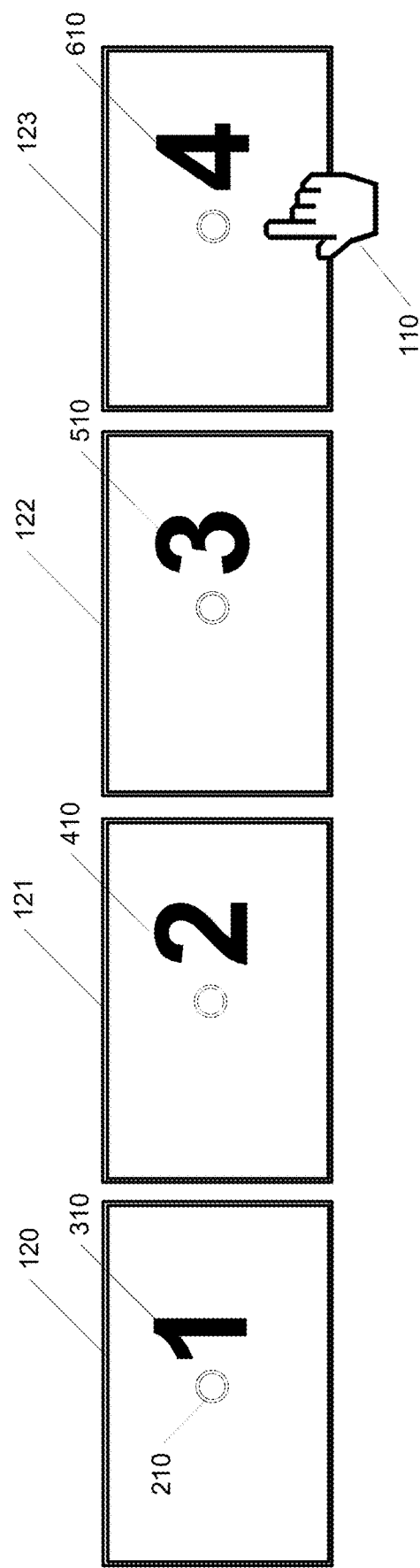
FIG. 6 is a diagram illustrating configuration of displays in accordance with the present disclosure.

Referring to FIG. 6, after the user 110 touches the fourth of the displays 123, a "4" 610 is rendered on the screen of the fourth display to indicate that this is the fourth display in the set of displays. The configuration of the four displays 120 for this phase is now complete.

In some embodiments, the spatial configurator 150 may perform a best fit of the user input to determine the arrangement of the display devices. For example, the range of possible configurations may be limited to those that are likely based on the available information. For example, the set of possible form factors for the display devices may be restricted, allowing for an intelligent set of alignment and orientation options that the user can select. This can reduce the number of ways that the user can set up an incorrect configuration. In one example, if the identification of the particular display device is available, including the brand and model, then the characteristics of the particular brand and model including the physical dimensions of the display, as well as the display size of the display may be obtained. This information may be used to limit the specific arrangement of the displays that are available for user selection. The information may also be used to inform the graphics subsystem 160 on the possible sizes of the rendered outputs. The spatial configurator 150 may incorporate capabilities of the available sensors to provide the inputs for determining the spatial arrangement.

Figure 7:
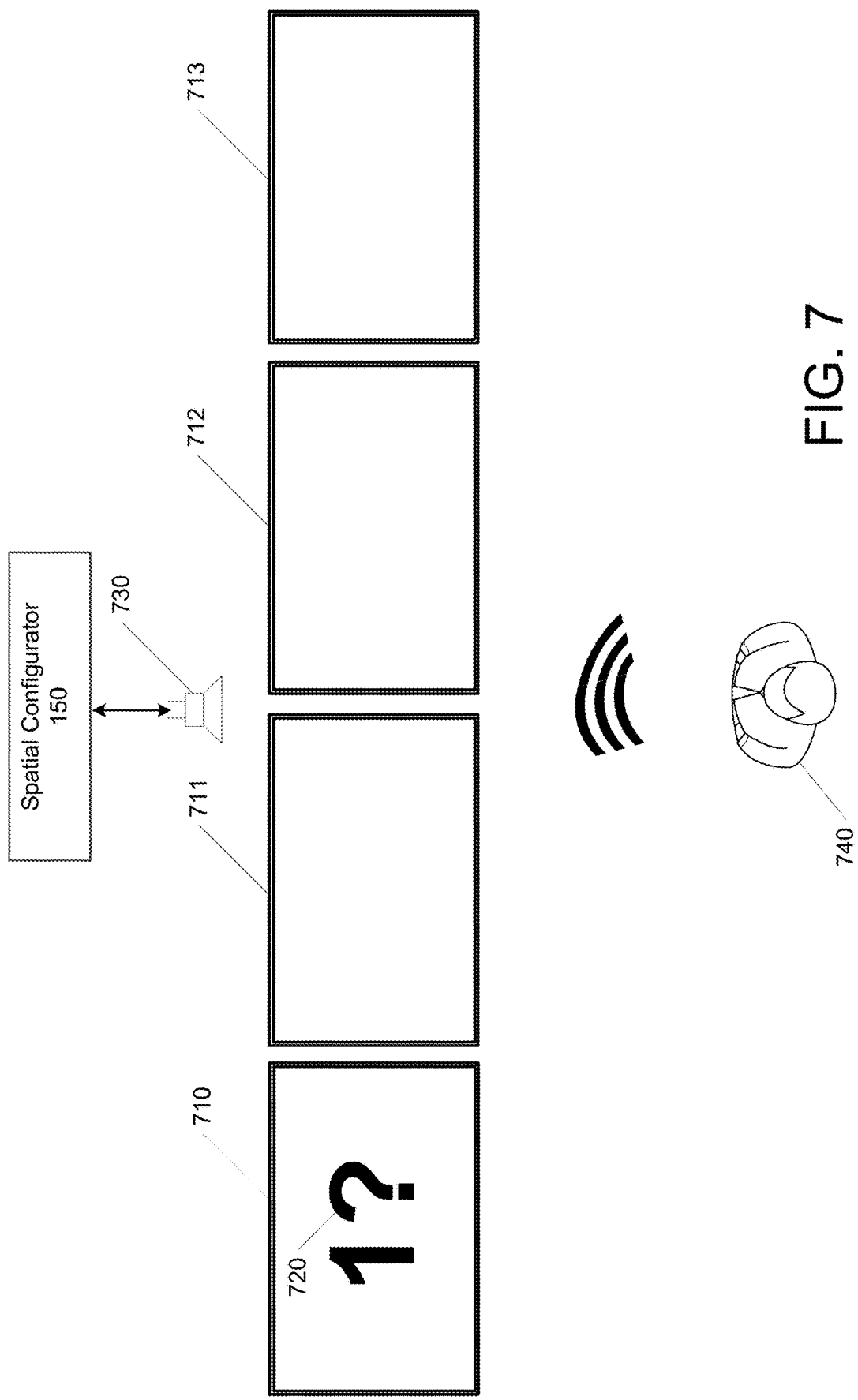
FIG. 7 is a diagram illustrating configuration of displays in accordance with the present disclosure.

Referring to FIG. 7, illustrated is an example arrangement of four displays 710, 720, 730 and 740 that are arranged in a horizontal alignment. In an embodiment, spatial configurator 150 may be configured to provide a graphical interface via displays 710, 711, 712 and 713 to prompt the user 110 to provide inputs that identify the ordering of the displays 710, 711, 712 and 713. The prompts may be provided directly on the displays 710, 711, 712 and 713. In this example, display 710 may display a prompt 720 that indicates to the user 740 that the user 740 should respond to the inquiry as to whether the first of the displays 710 is the first display in the order of displays. For example, the spatial configurator 150 may render text on one of the displays 710 that indicates: "say yes when this display indicates the desired display position (1, 2, 3, or 4)." In addition to prompts on the displays 710, 711, 712 and 713, audio prompts may be provided on audio speakers (not shown on FIG. 7) which may be physically integrated on the displays 710, 711, 712 and 713 or on separate audio speakers. Also illustrated is a microphone 730 that may be coupled to the spatial configurator 150 via a network or other communications medium.

Figure 8:
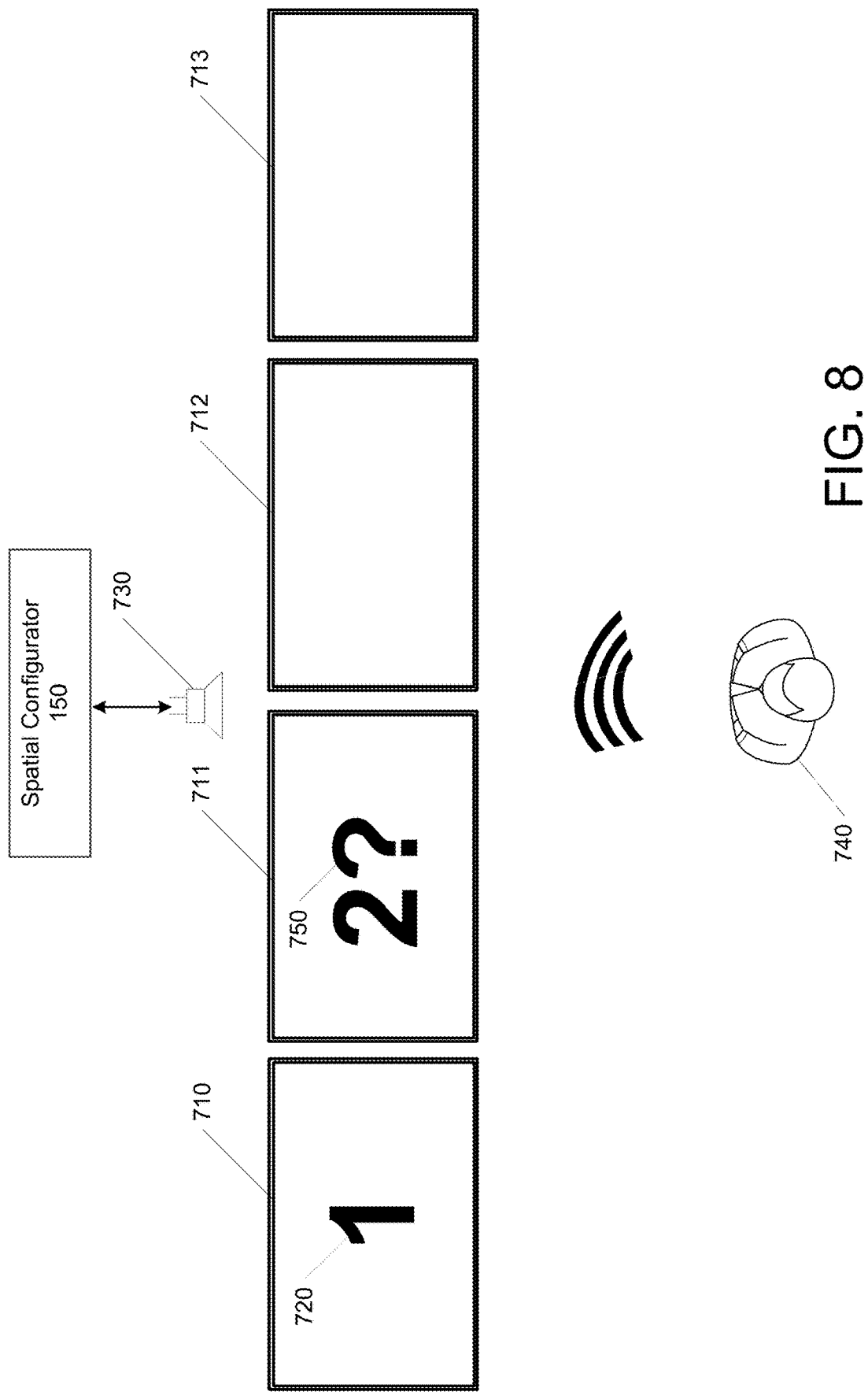
FIG. 8 is a diagram illustrating configuration of displays in accordance with the present disclosure.

The user 740 may speak "yes" to the prompt 720 to indicate that the first of the displays 710 is the first display of the group of displays. Referring to FIG. 8, after the user 740 responds to the prompt 720, a "1" is rendered on the screen of the first display 710 to indicate that this is the first display in the set of displays. The spatial configurator 150 may then configure the second display 711. The spatial configurator 150 may cause the second of the displays 711 to display a prompt 750 that indicates to the user 740 that the user 740 should respond to the inquiry as to whether the second of the displays 711 is the second display in the order of displays.

The user 740 may speak "yes" to indicate that the second of the displays 711 is the second display of the group of displays.

Figure 9:
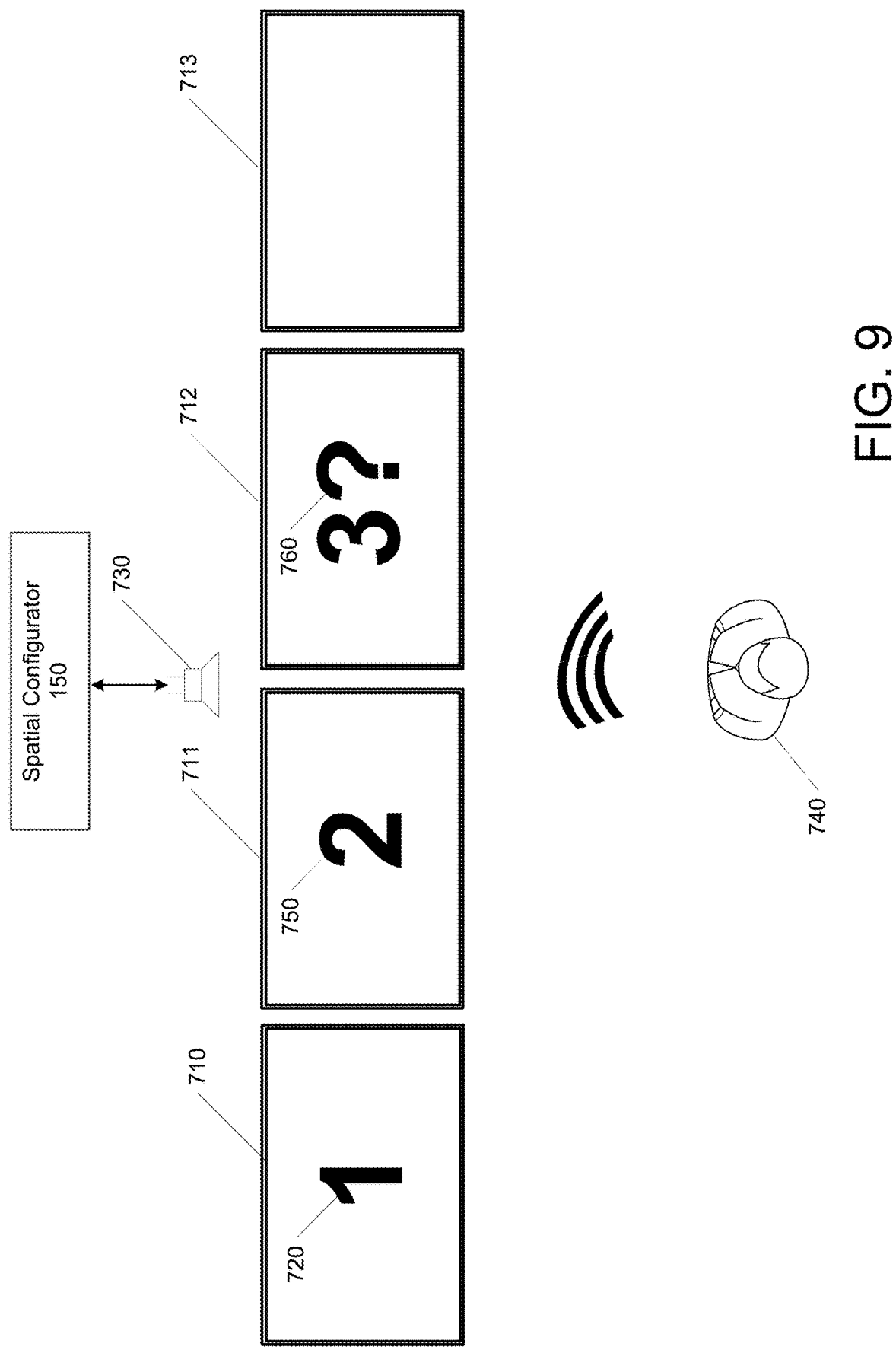
FIG. 9 is a diagram illustrating configuration of displays in accordance with the present disclosure.

Referring to FIG. 9, after the user 740 responds to the prompt 750, a "2" is rendered on the screen of the second display 711 to indicate that this is the second display in the set of displays. The spatial configurator 150 may then configure the third display. The spatial configurator 150 may cause the third of the displays 712 to display a prompt 760 that indicates to the user 740 that the user 740 should respond to the inquiry as to whether the third of the displays 712 is the third display in the order of displays.

Figure 10:
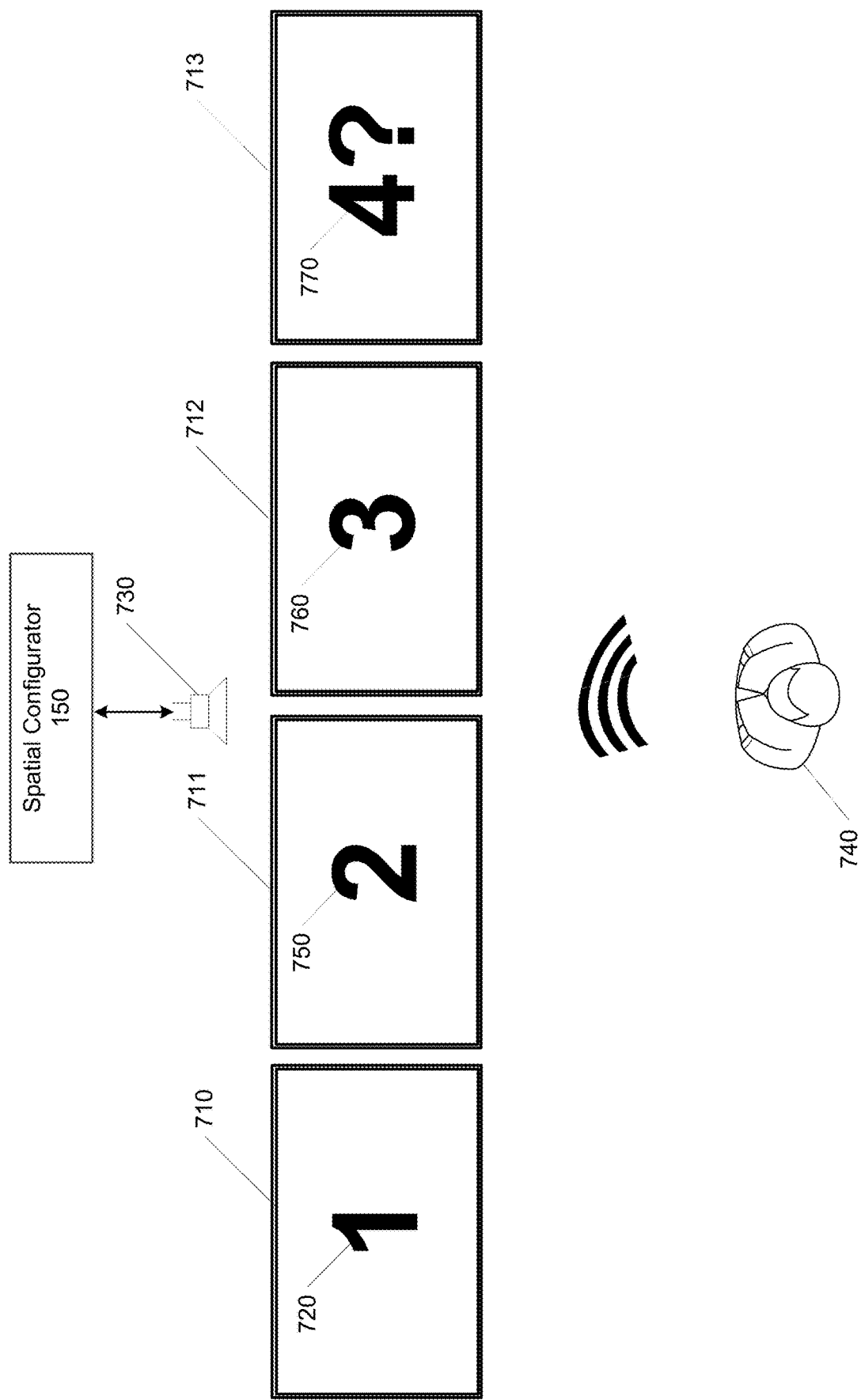
FIG. 10 is a diagram illustrating configuration of displays in accordance with the present disclosure.

The user 740 may speak "yes" to indicate that the third of the displays 712 is the third display of the group of displays. Referring to FIG. 10, after the user 740 responds to the prompt 760, a "3" is rendered on the screen of the third display 730 to indicate that this is the third display 712 in the set of displays. The spatial configurator 150 may then configure the fourth display 713. The spatial configurator 150 may cause the fourth of the displays 713 to display a prompt 770 that indicates to the user 740 that the user 740 should respond to the inquiry as to whether the fourth of the displays 713 is the fourth display in the order of displays.

Figure 11:
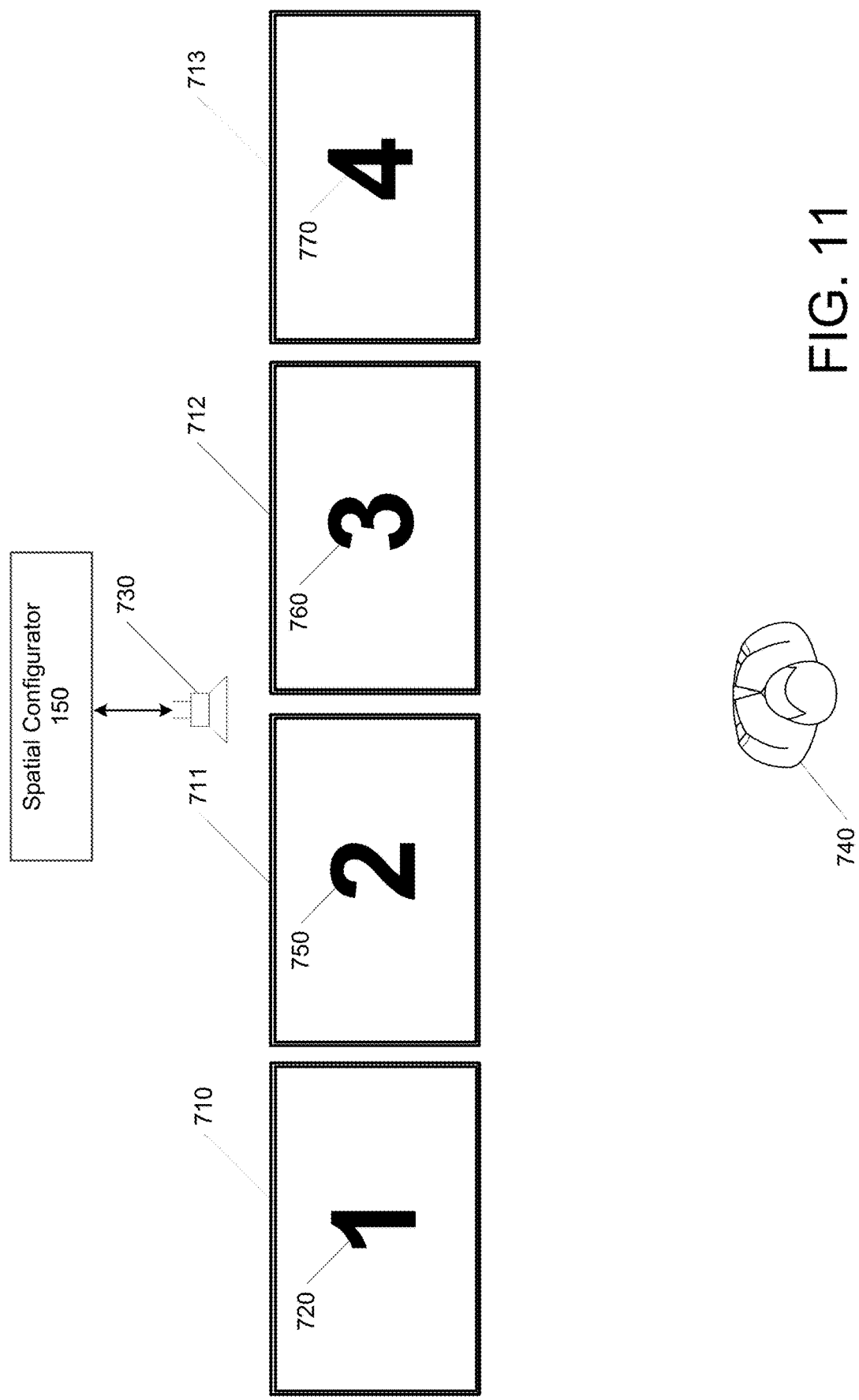
FIG. 11 is a diagram illustrating configuration of displays in accordance with the present disclosure.

The user 740 may speak "yes" to indicate that the fourth of the displays 713 is the fourth display of the group of displays. Referring to FIG. 11, after the user 740 responds to the prompt 770, a "4" is rendered on the screen of the fourth display 713 to indicate that this is the fourth display in the set of displays. Configuration for this phase of the display setup may then be considered complete.

Referring back to FIG. 1B, if one or more displays 120 have a camera or other capability to detect movement or gestures of a user 110, or if a camera is coupled to the device 100 via network 130, then the spatial configurator 150 may prompt for user gestures to confirm information for determining the arrangement of the displays 120. The camera may use eye tracking, identification of where the user is standing in relation to the camera or display, the direction which the user is speaking, or a wave or other gesture of the user.

Figure 12:
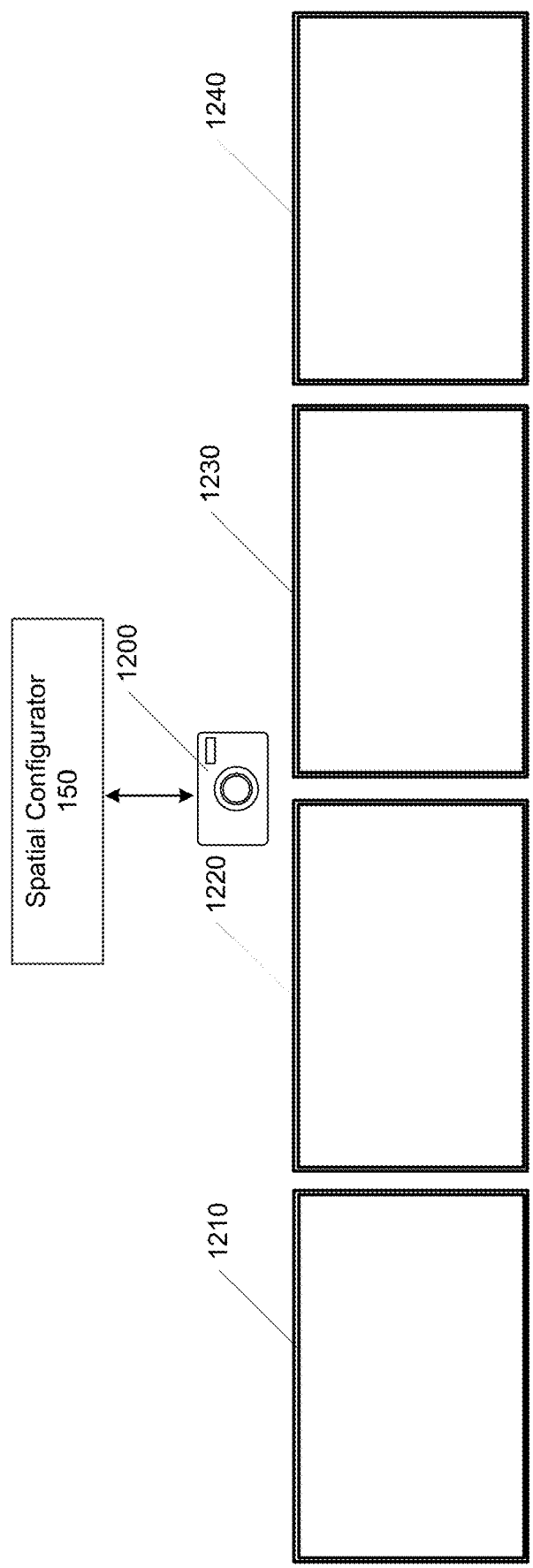
FIG. 12 is a diagram illustrating configuration of displays in accordance with the present disclosure.

Referring to FIG. 12, illustrated is an example arrangement of four displays 1210, 1220, 1230, and 1240 that are arranged in a horizontal alignment. In an embodiment, spatial configurator 150 may be configured to provide a graphical interface via displays 1210, 1220, 1230, and 1240 to prompt a user to provide inputs that identify the ordering of the displays 710. Also illustrated is a camera 1200 that may be coupled to the spatial configurator 150 via a network or other communications medium.

Figure 13:
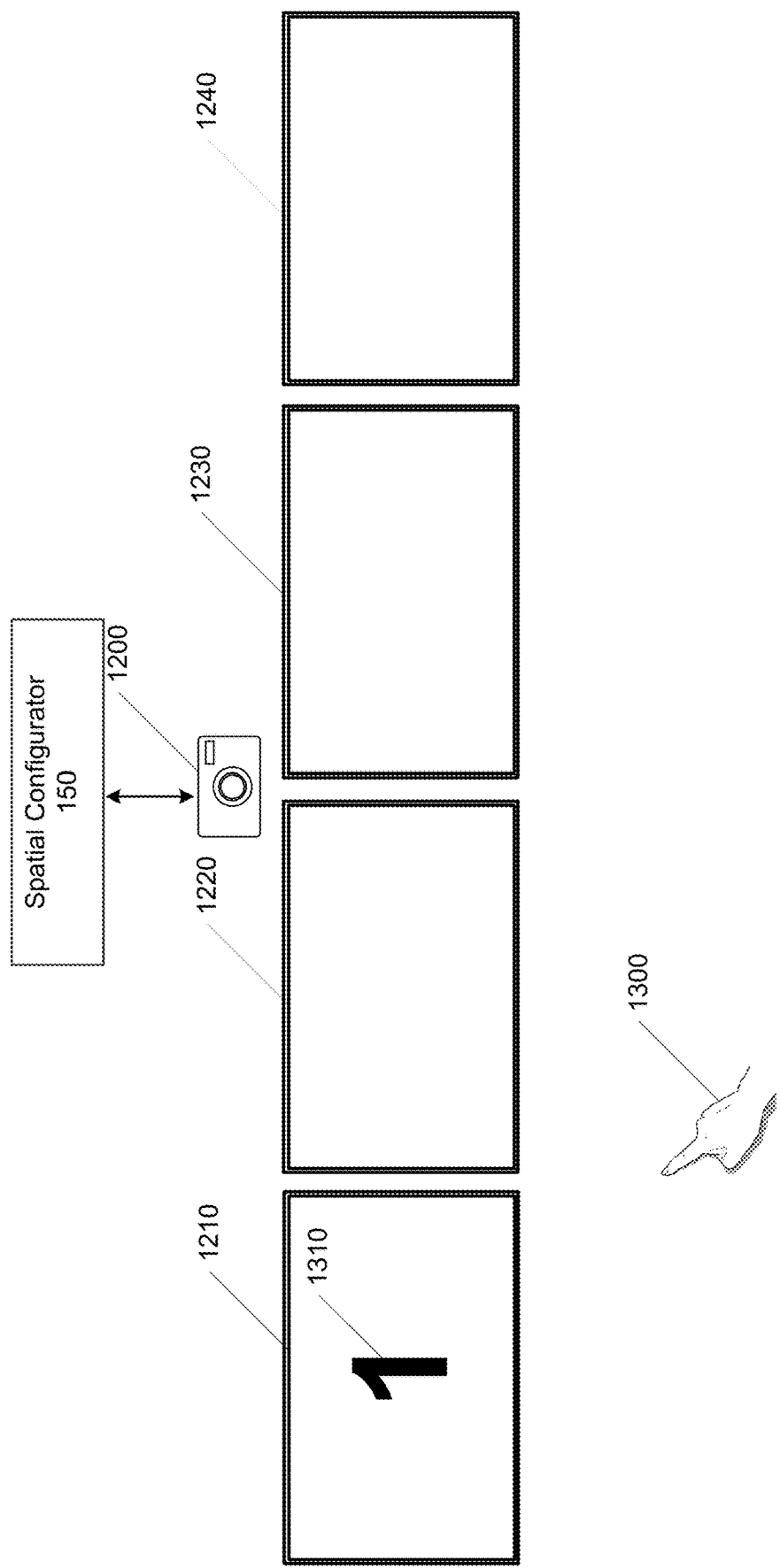
FIG. 13 is a diagram illustrating configuration of displays in accordance with the present disclosure.

Referring to FIG. 13, a user 110 may make a gesture 1300 that may point to a display or provide some other gesture to indicate that the first of the displays 1210 is the first display of the group of displays. After the user 1300 performs the gesture 1300 which has been captured by the camera and processed, a "1" 1310 is rendered on the screen of the first display 1210 to indicate that this is the first display in the set of displays.

Figure 14:
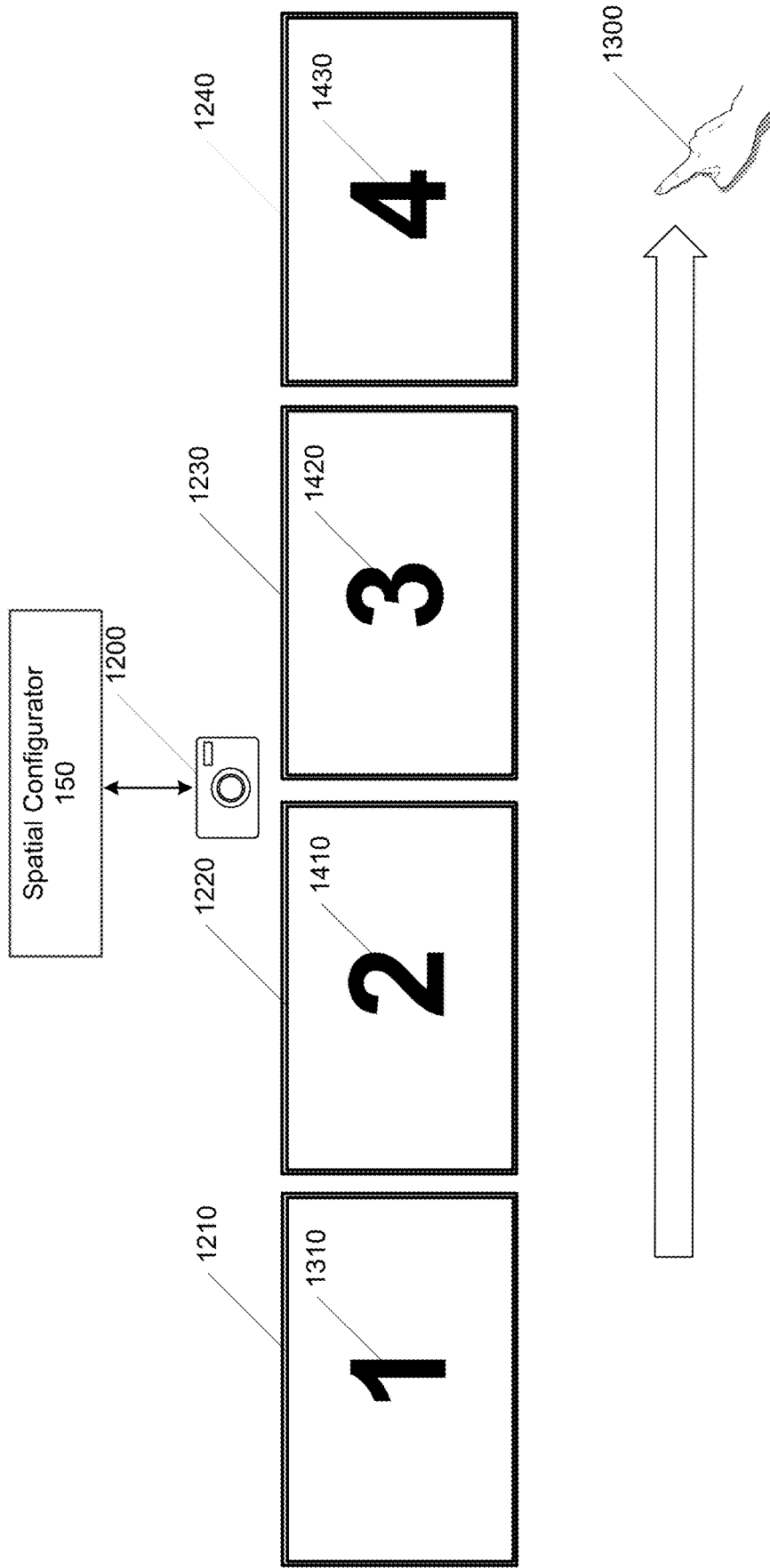
FIG. 14 is a diagram illustrating configuration of displays in accordance with the present disclosure.

Referring to FIG. 14, the user 110 may make a gesture 1300 that may perform a left-to-right hand directional gesture to indicate the second 1220, third 1230, and fourth 1240 of the displays. After the user performs the gesture, a "2" 1410 is rendered on the screen of the second display 1220 to indicate that this is the second display in the set of displays, a "3" 1420 is rendered on the screen of the third display 1230 to indicate that this is the third display in the set of displays, and a "4" 1430 is rendered on the screen of the fourth display 1240 to indicate that this is the fourth display in the set of displays.

Figure 15:
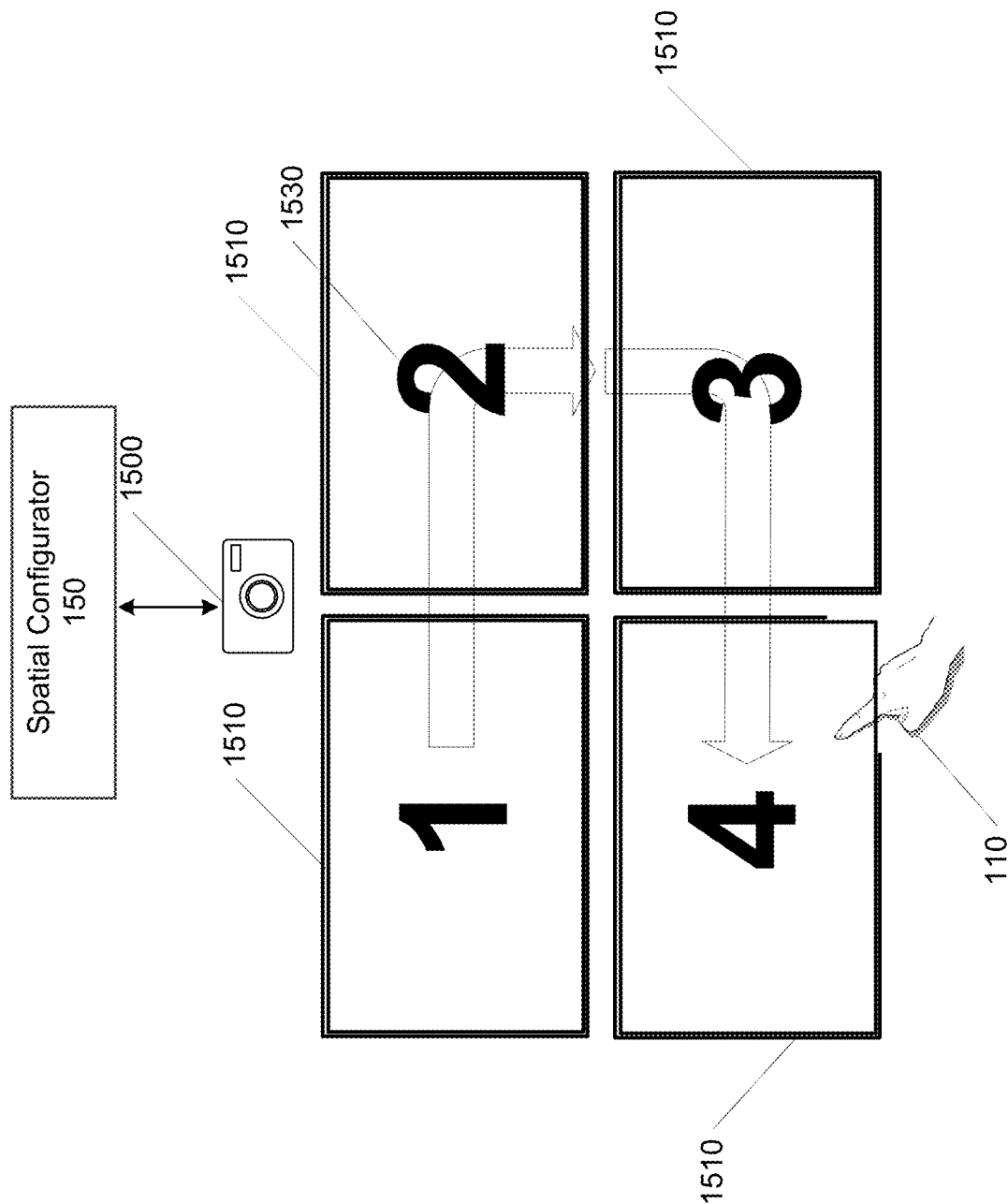
FIG. 15 is a diagram illustrating configuration of displays in accordance with the present disclosure.

FIG. 15 illustrates another example of use of a gesture to configure displays. The figure illustrates another configuration for the displays 1510 in a two-on-top, two-on-the-bottom arrangement. The user 110 may perform a clockwise gesture 1520 starting from the top-left display to indicate the first, second, third, and fourth of the displays 1510. After the user performs the gesture 1520, indicators 1530 are rendered on the screens of each of the displays to indicate their ordering.

Figure 16:
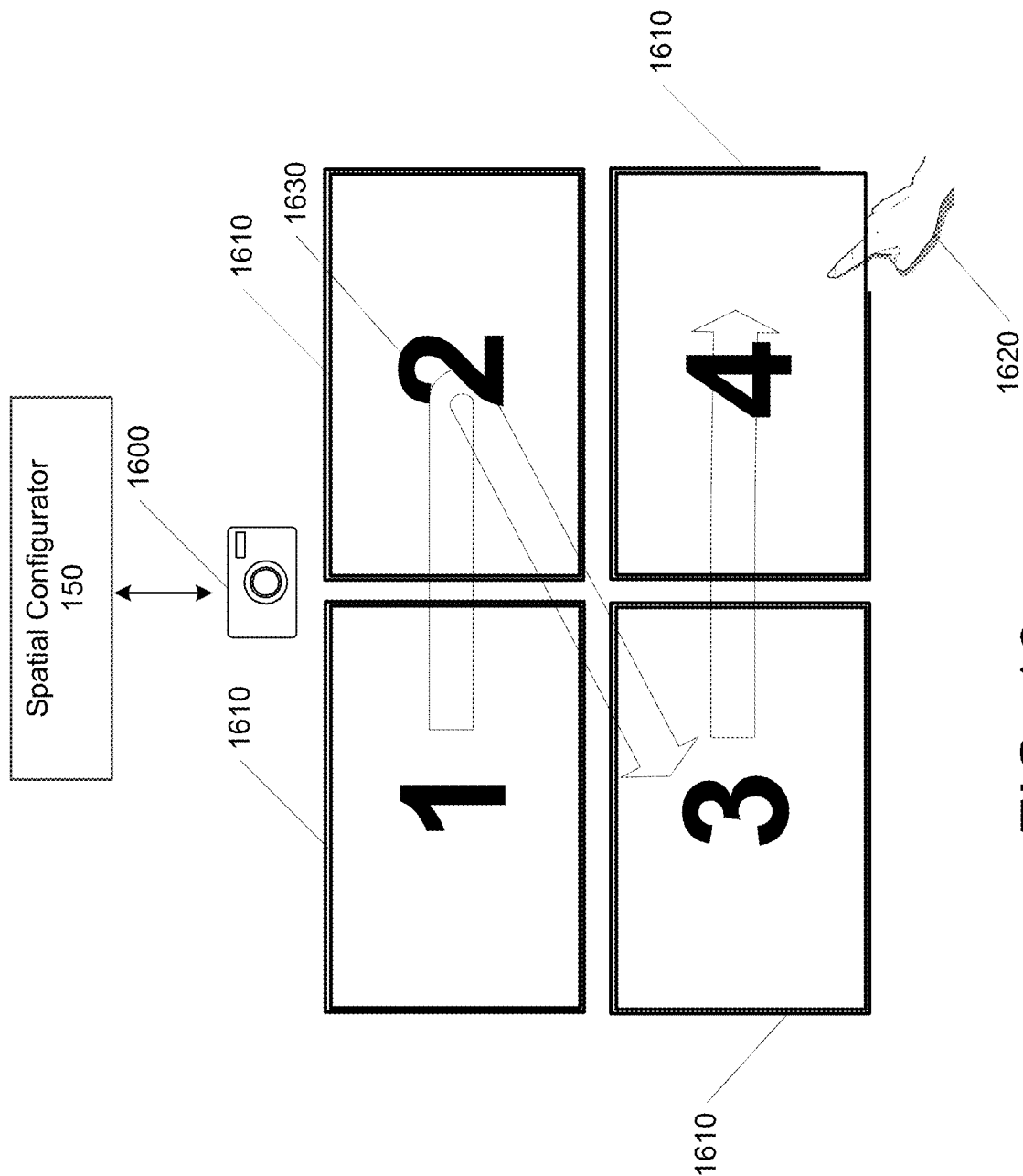
FIG. 16 is a diagram illustrating configuration of displays in accordance with the present disclosure.

FIG. 16 illustrates another example of use of a gesture 1620 to configure displays. The figure illustrates the configuration for the displays 1610 in a two-on-top, two-on-the-bottom arrangement. The user 1620 may perform a Z-shaped gesture 1620 starting from the top-left display to indicate the first, second, third, and fourth of the displays 1610. After the user performs the gesture 1620, indicators 1630 are rendered on the screens of each of the displays to indicate their ordering.

In general, the displays may render identifiers so that users can identify each display, such as a number, shape, color, or other visual means of identification.

Figure 17:
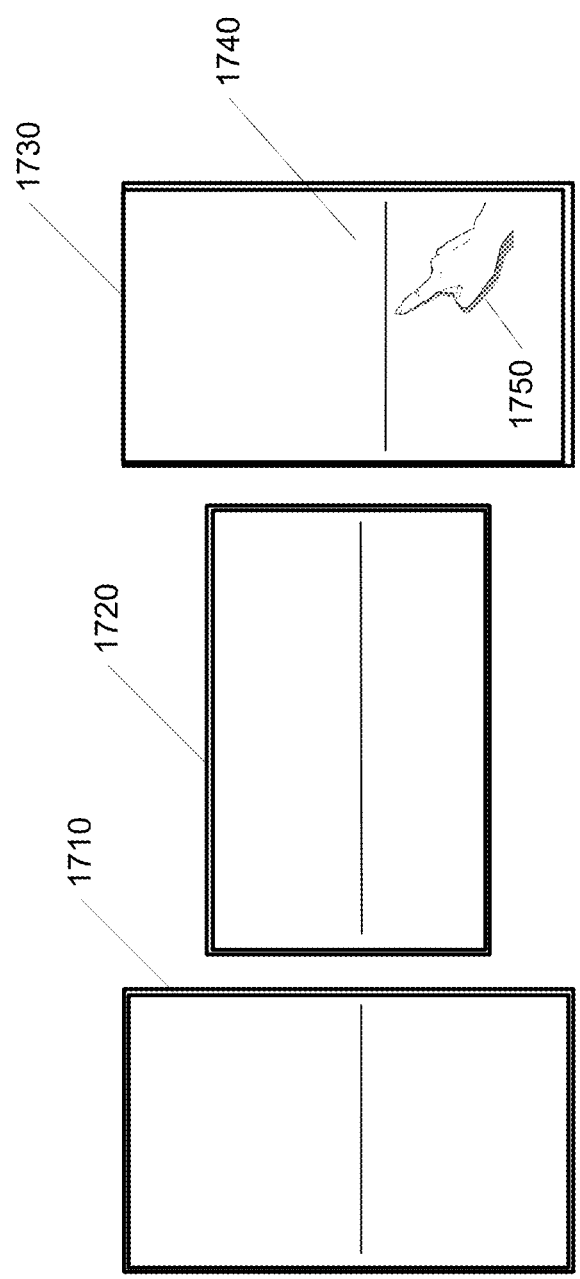
FIG. 17 is a diagram illustrating configuration of displays in accordance with the present disclosure.
Figure 18:
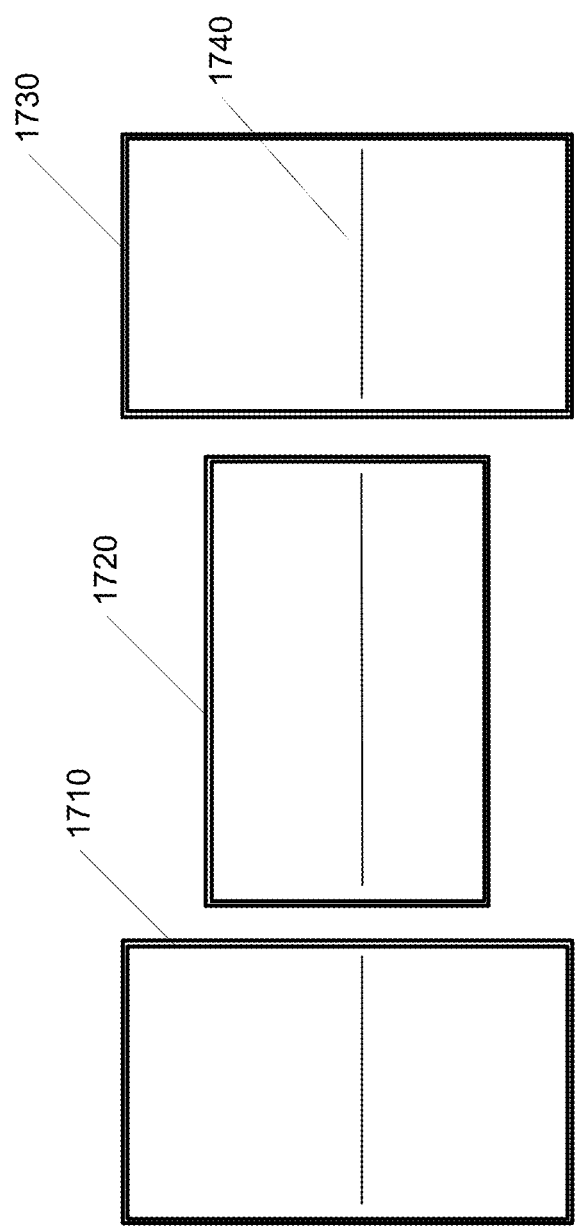
FIG. 18 is a diagram illustrating configuration of displays in accordance with the present disclosure.

Referring to FIG. 17, illustrated is an example of alignment of displays. Illustrated at three displays 1710, 1720, and 1730 that each have an alignment marker 1740. The alignment marker for 1730 is shown as not being aligned with the alignment markers of 1710 and 1720. The user may respond by making a touch gesture 1750 touching the alignment marker for display 1730 and moving the marker so that it aligns with the alignment markers of 1710 and 1720. Referring to FIG. 18, the alignment marker 1740 for display 1730 is now shown as being aligned with those of displays 1710 and 1720.

In some embodiments, the spatial configurator may allow the creation of subgroupings of displays. For example, a set of four displays may be grouped into two subgroups of two displays each. The spatial configurator may thus allow the user to identify the number of groupings, and then to identify the spatial arrangement of each of the groups. This may be done by prompting the user to identify a number of groupings. The user may then be prompted to input the arrangement of displays in each grouping, using the techniques disclosed herein. Alternatively, the user may be allowed to define an ordering and provide an indication that the current display is the last one of a group. For example, the user may double-tap or enter some other indication that the current display is the last one of the group. If the spatial configurator knows that there are other displays that have been identified but have not been placed into a known arrangement, the spatial configurator may prompt the user at that time as to whether the additional displays will be part of a second subgrouping. Other methods are also contemplated, such as prompting the user after each display is identified as to whether there are additional displays to add to the grouping.

In some embodiments, a subgrouping may have only one display, such as a projector that may be treated as having its own display properties.

Some display devices may not have a direct means of input, such as a projector. In such cases, the user may be prompted to identify an ordering for the projector on another display device that is capable of receiving user inputs.

Simplifications and assumptions may be made to minimize the amount of user input data that is needed. For example, if the displays have the means to determine their orientation through the use of on-device sensors, then this information may be utilized to reduce the amount of information that is presented to the user for confirmation. Furthermore, if the displays have sensors that can detect their proximity and alignment relative to one another, then the alignment between displays may be determined and presented to the user for confirmation. Once the user input is saved, the configuration information may be maintained and used by the system until the user changes the configuration.

In the case of a set of arranged displays, once the spatial arrangement is known, the boundaries of the integrated display may be determined and graphics generation functions may determine a display canvas for graphics that are to be generated for the integrated display. For example, the overall display canvas may be segmented into a number of display portions based on the number of available displays. The display canvas may be, for an example, a workspace, desktop, or any display that includes the entirety of what is to be rendered. A display portion may be a subdivided part of the display canvas, which can be, for example, a window, a proportionate part of the display canvas based on the ratio of the individual display to the integrated display.

Figure 19:
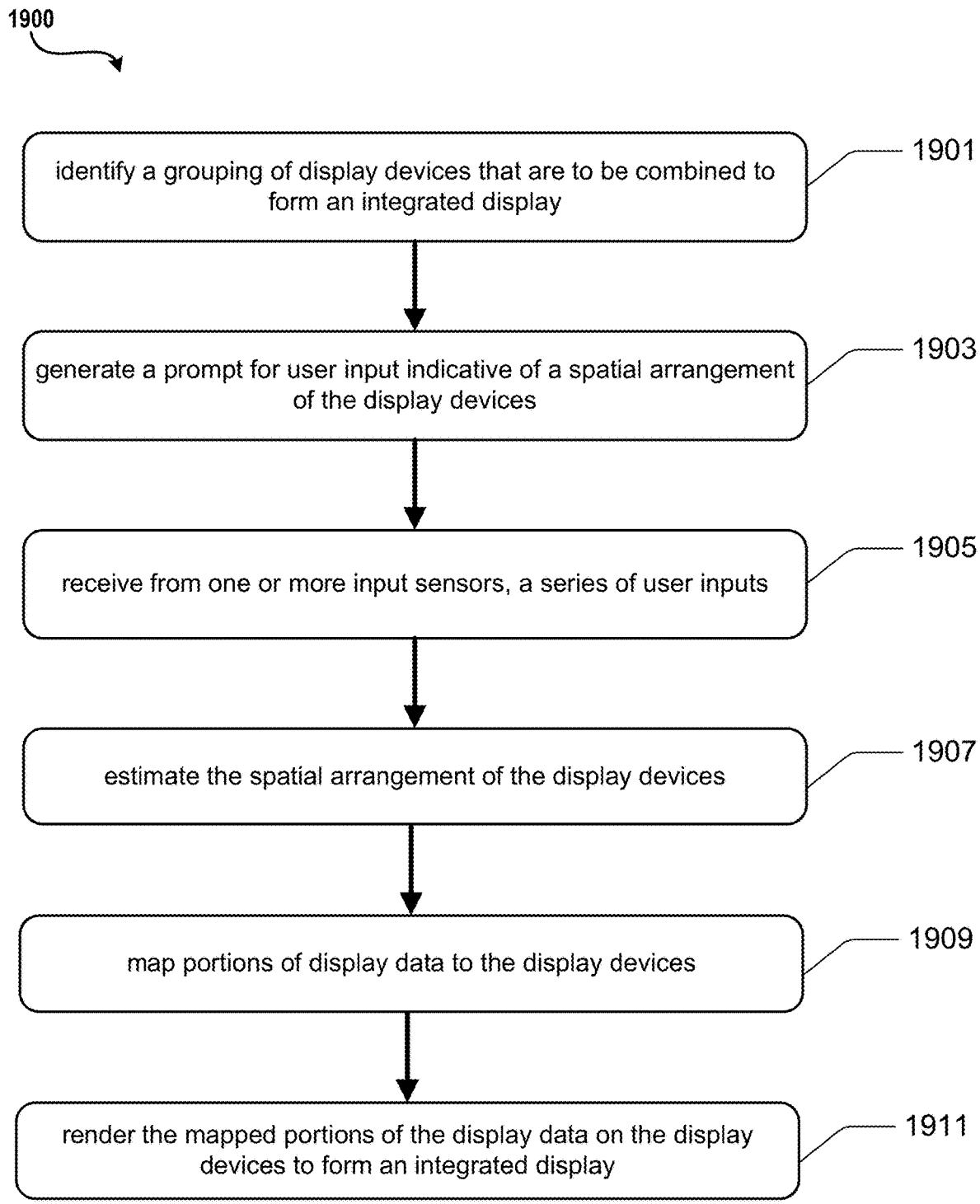
FIG. 19 is a flowchart depicting an example procedure for configurating displays in accordance with the present disclosure.

Turning now to FIG. 19, illustrated is an example operational procedure for configuring multiple display devices in accordance with the present disclosure. In an embodiment, the example operational procedure may implement a method executing on one or more computing devices. Such an operational procedure can be provided by services such as the spatial configurator in FIG. 1B. The operational procedure may be implemented in a system comprising one or more computing devices. Referring to FIG. 19, operation 1901 illustrates identifying a grouping of display devices that are to be combined to form an integrated display.

Operation 1901 may be followed by operation 1903. Operation 1903 illustrates generating a prompt for user input indicative of a spatial arrangement of the display devices. Operation 1903 may be followed by operation 1905. Operation 1905 illustrates in response to the prompt, receiving, from one or more input sensors, a series of user inputs.

Operation 1905 may be followed by operation 1907. Operation 1907 illustrates estimating, based on the series of user inputs, the spatial arrangement of the display devices. Operation 1907 may be followed by operation 1909. Operation 1909 illustrates based on the estimated spatial arrangement of the display devices, mapping portions of display data to the display devices. The operation ends at Operation 1911, which illustrates rendering the mapped portions of the display data on the display devices to form an integrated display.

Figure 20:
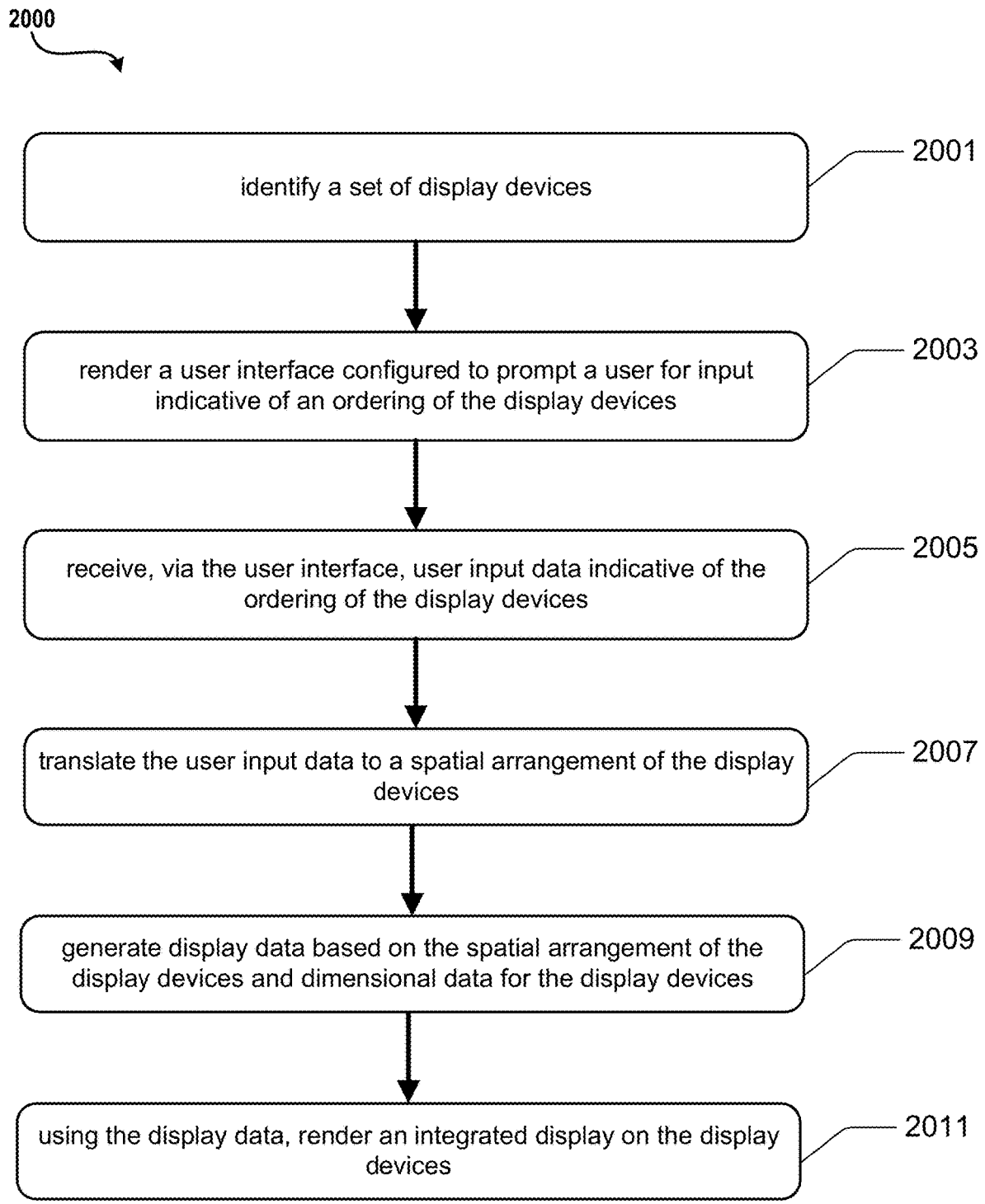
FIG. 20 is a flowchart depicting an example procedure for configurating displays in accordance with the present disclosure.

Referring to FIG. 20, illustrated is another example operational procedure for configuring displays in accordance with the present disclosure. In an embodiment, the example operational procedure may implement a system. Such an operational procedure can be provided by services such as the spatial configurator 150 in FIG. 1B. The operational procedure may be implemented in a system comprising one or more computing devices. Referring to FIG. 20, operation 2001 illustrates identifying a set of display devices.

Operation 2001 may be followed by operation 2003. Operation 2003 illustrates rendering a user interface configured to prompt a user for input indicative of an ordering of the display devices.

Operation 2003 may be followed by operation 2005. Operation 2005 illustrates receiving, via the user interface, user input data indicative of the ordering of the display devices.

Operation 2005 may be followed by operation 2007. Operation 2007 illustrates translating the user input data to a spatial arrangement of the display devices.

Operation 2007 may be followed by operation 2009. Operation 2009 illustrates generating display data based on the spatial arrangement of the display devices and dimensional data for the display devices. Operation 2009 may be followed by operation 2011. Operation 2011 illustrates using the display data, render an integrated display on the display devices, where FIG. 20 ends.

Figure 21:
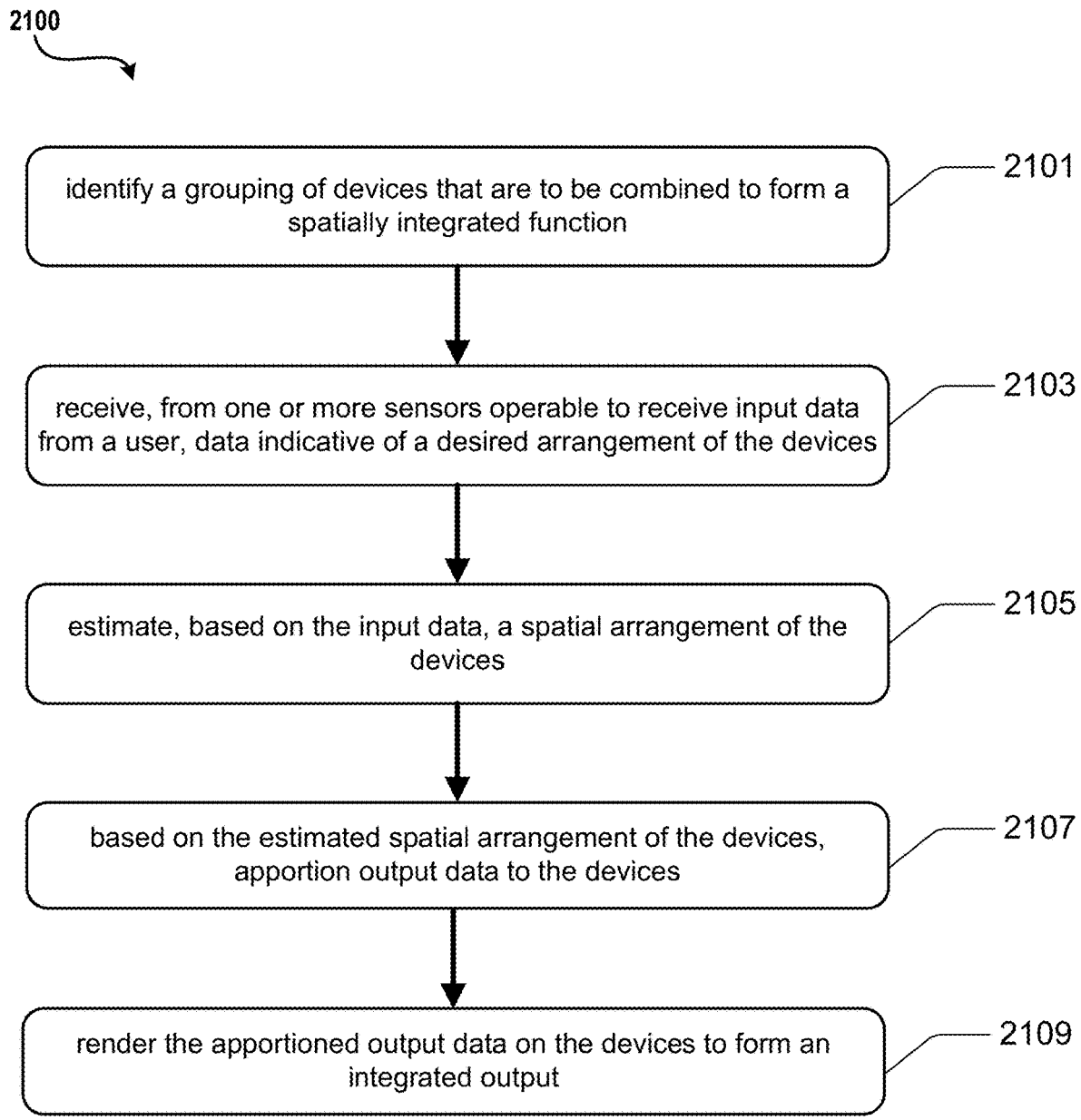
FIG. 21 is a flowchart depicting an example procedure for configurating displays in accordance with the present disclosure.

Referring to FIG. 21, illustrated is an example operational procedure for configuring devices in accordance with the present disclosure. In an embodiment, the example operational procedure may implement a computer-readable storage medium having computer-executable instructions stored thereupon which, when executed by one or more processors of a computing device, cause the computing device to perform operations executing on one or more computing devices. Such an operational procedure can be provided by services such as the spatial configurator 150 in FIG. 1B. Referring to FIG. 21, Operation 2101 illustrates identifying a grouping of devices that are to be combined to form a spatially integrated function.

Operation 2101 may be followed by Operation 2103. Operation 2103 illustrates receiving, from one or more sensors operable to receive input data from a user, data indicative of a desired arrangement of the devices.

Operation 2103 may be followed by Operation 2105. Operation 2105 illustrates estimating, based on the input data, a spatial arrangement of the devices.

Operation 2105 may be followed by Operation 2107. Operation 2107 illustrates based on the estimated spatial arrangement of the devices, apportioning output data to the devices. Operation 2107 may be followed by Operation 2109. Operation 2109 illustrates rendering the apportioned output data on the devices to form an integrated output, where FIG. 21 ends.

Example Clauses

The disclosure presented herein may be considered in view of the following clauses.

Example Clause A, a method for configuring multiple display devices, the method comprising:

identifying a grouping of display devices that are to be combined to form an integrated display;

generating a prompt for user input indicative of a spatial arrangement of the display devices;

in response to the prompt, receiving, from one or more input sensors, a series of user inputs;

estimating, based on the series of user inputs, the spatial arrangement of the display devices;

based on the estimated spatial arrangement of the display devices, mapping portions of display data to the display devices; and rendering the mapped portions of the display data on the display devices to form an integrated display.

Example Clause B, the computer-implemented method of Example Clause A, wherein the prompt comprises a rendering on each of the display devices an indication of a unique identifier.

Example Clause C, the computer-implemented method of any one of Example Clauses A through B, wherein the one or more input sensors comprises touch-sensitive displays.

Example Clause D, the computer-implemented method of any one of Example Clauses A through C, wherein the series of user inputs comprises a series of user touches to the touch-sensitive displays.

Example Clause E, the computer-implemented method of any one of Example Clauses A through D, wherein the one or more input sensors comprises at least one camera.

Example Clause F, the computer-implemented method of any one of Example Clauses A through E, wherein the series of user inputs comprises a series of gestures that indicate at least one direction.

Example Clause G, the computer-implemented method of any one of Example Clauses A through F, wherein the spatial arrangement comprises an ordering of each of the display devices in the grouping.

Example Clause H, the computer-implemented method of any one of Example Clauses A through G, wherein the one or more input sensors comprises at least one audio input device.

Example Clause I, the computer-implemented method of any one of Example Clauses A through H, wherein the series of user inputs comprises a series of voice commands.

Example Clause J, the computer-implemented method of any one of Example Clauses A through I, wherein the spatial arrangement comprises an alignment of each of the display devices in the grouping.

Example Clause K, the computer-implemented method of any one of Example Clauses A through J, further comprising rendering, on the display devices of the grouping, an indication of an order of each of the display devices.

Example Clause L, a computing device, comprising:
one or more processors; and
a memory in communication with the one or more processors, the memory having computer-readable instructions stored thereupon that, when executed by the one or more processors, cause the computing device to perform operations comprising:
identifying a set of display devices;
rendering a user interface configured to prompt a user for input indicative of an ordering of the display devices;
receiving, via the user interface, user input data indicative of the ordering of the display devices;
translating the user input data to a spatial arrangement of the display devices;
generating display data based on the spatial arrangement of the display devices and dimensional data for the display devices; and
using the display data, rendering an integrated display on the display devices.

Example Clause M, the computer-implemented method of any one of Example Clause L, wherein the user interface comprises a touchscreen input, and the user input data comprises a series of touch inputs on successive ones of the display devices.

Example Clause N, the computer-implemented method of any one of Example Clauses L through M, wherein the user interface comprises an optical input device, and the user input data comprises one or more gestures indicative of an ordering of the display devices.

Example Clause O, the computer-implemented method of any one of Example Clauses L through N, wherein the generating display data comprises generating a display area including the individual display areas of the arranged display devices.

Example Clause P, the computer-implemented method of any one of Example Clauses L through O, wherein the user interface comprises an audio input device, and the user input data comprises one or more voice commands.

Example Clause Q, the computer-implemented method of any one of Example Clauses L through P, wherein the one or more gestures include a directional gesture indicative of the ordering of the display devices.

Example Clause R, a computer-readable storage medium having computer-executable instructions stored thereupon which, when executed by one or more processors of a computing device, cause the computing device to:
identify a grouping of devices that are to be combined to form a spatially integrated function;
receive, from one or more sensors operable to receive input data from a user, data indicative of a desired arrangement of the devices;
estimate, based on the input data, a spatial arrangement of the devices;
based on the estimated spatial arrangement of the devices, apportion output data to the devices; and
render the apportioned output data on the devices to form an integrated output.

Example Clause S, the computer-implemented method of Example Clause R, wherein the devices are display devices that are spatially arranged to form an integrated display.

Example Clause T, the computer-implemented method of any one of Example Clauses R through S, further comprising computer-executable instructions stored thereupon which, when executed by one or more processors of a computing device, cause the computing device to identify a second grouping of devices that are to be combined to form a second spatially integrated output.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems. The embodiments described herein may also be practiced in distributed computing environments, where tasks are performed by remote processing devices that are linked through a communications network. In a distributed computing environment, program modules may be located in both local and remote memory storage devices.

Figure 22:
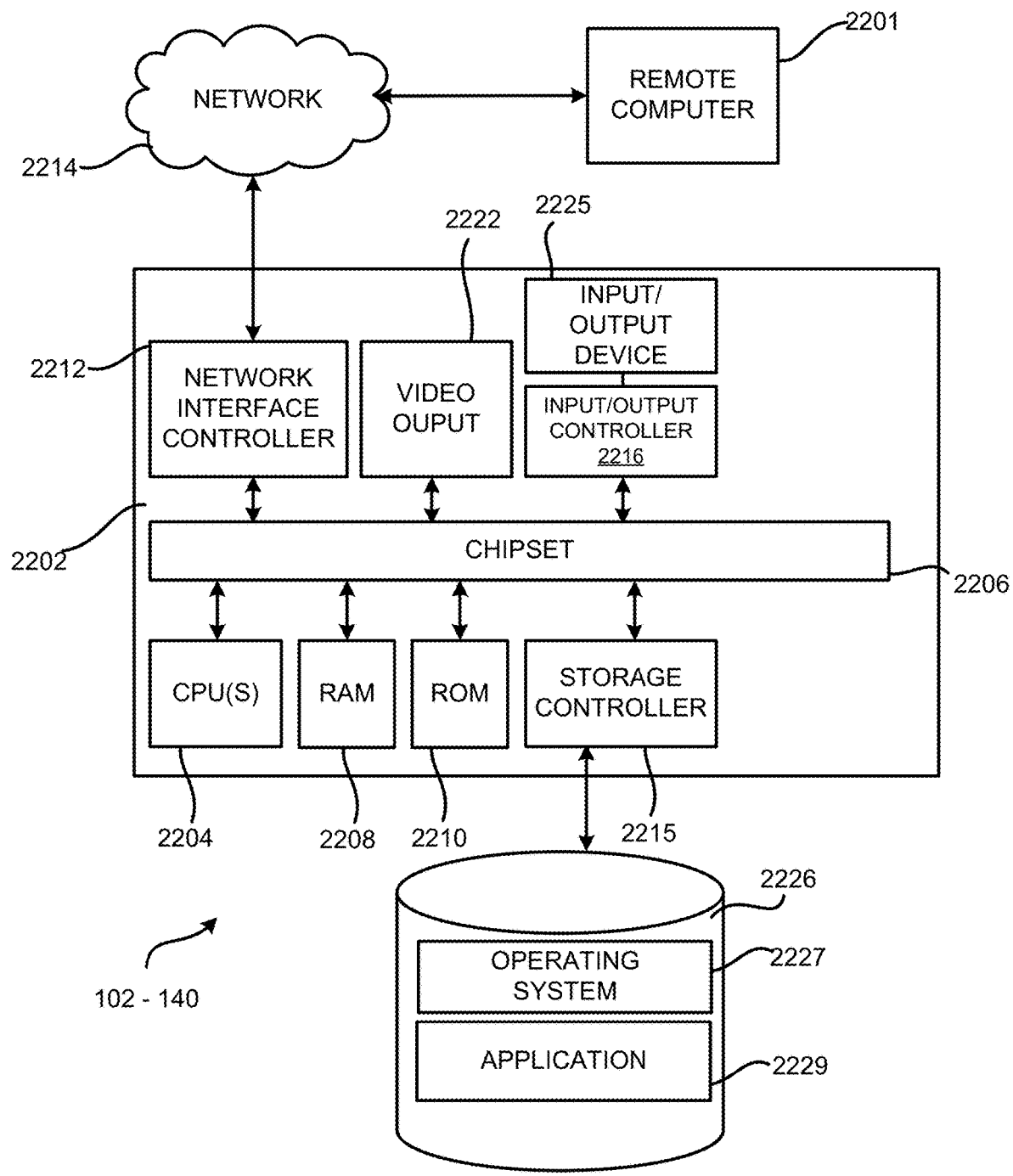
FIG. 22 is an example computing device in accordance with the present disclosure.

FIG. 22 shows additional details of an example computer architecture capable of various aspects of the embodiments described above. The computer architecture shown in FIG.

22 illustrates aspects of a system, such as a conventional server computer, workstation, desktop computer, laptop, tablet, computing or processing systems embedded in devices (such as wearables, automobiles, home automation etc.), or other computing device, and may be utilized to execute any of the software components presented herein. For example, the computer architecture shown in FIG. 22 may be utilized to execute any of the software components described above.

The computer architecture includes a baseboard 2202, or "motherboard," which is a printed circuit board to which a multitude of components or devices may be connected by way of a system bus or other electrical communication paths. In one illustrative embodiment, one or more central processing units ("CPUs") 2204 operate in conjunction with a chipset 2206. The CPUs 2204 may be standard programmable processors that perform arithmetic and logical operations necessary for the operation of the computer architecture.

The CPUs 2204 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 2206 provides an interface between the CPUs 2204 and the remainder of the components and devices on the baseboard 2202. The chipset 2206 may provide an interface to a RAM 2208, used as the main memory in the computer architecture. The chipset 2206 may further provide an interface to a computer-readable storage medium such as a read-only memory ("ROM") 2210 or non-volatile RAM ("NVRAM") for storing basic routines that help to startup the computing device and to transfer information between the various components and devices. The ROM 2210 or NVRAM may also store other software components necessary for the operation of the computer architecture in accordance with the embodiments described herein.

The computer architecture may operate in a networked environment using logical connections to remote computing devices and computer systems through a network 2214, such as the local area network. The chipset 2206 may include functionality for providing network connectivity through a network interface controller (NIC) 2212, such as a gigabit Ethernet adapter. The NIC 2212 is capable of connecting the computer architecture to other computing devices over the network 2214. It should be appreciated that multiple NICs 2212 may be present in the computer architecture, connecting the computer to other types of networks and remote computer systems. The network allows the computer architecture to communicate with remote services and servers, such as the remote computer 2201. As can be appreciated, the remote computer 2201 may host a number of services such as the XBOX LIVE gaming service provided by MICROSOFT CORPORATION of Redmond, Wash. In addition, as described above, the remote computer 2201 may mirror and reflect data stored on the computer architecture and host services that may provide data or processing for the techniques described herein.

The computer architecture may be connected to a mass storage device 2226 that provides non-volatile storage for the computing device. The mass storage device 2226 may store system programs, application programs, other program modules, and data, which have been described in greater detail herein. The mass storage device 2226 may be connected to the computer architecture through a storage controller 2215 connected to the chipset 2206. The mass storage device 2226 may consist of one or more physical storage units. The storage controller 2215 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units. It should also be appreciated that the mass storage device 2226, other storage media and the storage controller 2215 may include MultiMediaCard (MMC) components, eMMC components, Secure Digital (SD) components, PCI Express components, or the like.

The computer architecture may store data on the mass storage device 2226 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 2226 is characterized as primary or secondary storage, and the like.

For example, the computer architecture may store information to the mass storage device 2226 by issuing instructions through the storage controller 2215 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer architecture may further read information from the mass storage device 2226 by detecting the physical states or characteristics of one or more particular locations within the physical storage units.

In addition to the mass storage device 2226 described above, the computer architecture may have access to other computer-readable media to store and retrieve information, such as program modules, data structures, or other data. As the operating system 2227, the application 2229, other data and other modules are depicted as data and software stored in the mass storage device 2226, it should be appreciated that these components and/or other modules may be stored, at least in part, in other computer-readable storage media of the computer architecture. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer architecture. For purposes of the claims, the phrase "computer storage medium," "computer-readable storage medium," and variations thereof, does not include waves or signals per se and/or communication media.

The mass storage device 2226 may store an operating system 2227 utilized to control the operation of the computer architecture. According to one embodiment, the operating system comprises a gaming operating system. According to another embodiment, the operating system comprises the WINDOWS® operating system from MICROSOFT Corporation. According to further embodiments, the operating system may comprise the UNIX, ANDROID, WINDOWS PHONE or iOS operating systems, available from their respective manufacturers. It should be appreciated that other operating systems may also be utilized. The mass storage device 2226 may store other system or application programs and data utilized by the computer architecture, such as any of the other software components and data described above. The mass storage device 2226 might also store other programs and data not specifically identified herein.

In one embodiment, the mass storage device 2226 or other computer-readable storage media is encoded with computer-executable instructions which, when loaded into the computer architecture, transform the computer from a general-purpose computing system into a special-purpose computer capable of implementing the embodiments described herein. These computer-executable instructions transform the computer architecture by specifying how the CPUs 2204 transition between states, as described above. According to one embodiment, the computer architecture has access to computer-readable storage media storing computer-executable instructions which, when executed by the computer architecture, perform the various routines described above with regard to FIG. 22, and the other FIGURES. The computing device might also include computer-readable storage media for performing any of the other computer-implemented operations described herein.

The computer architecture may also include one or more input/output controllers 2216 for receiving and processing input from a number of input devices, such as a keyboard, a mouse, a microphone, a headset, a touchpad, a touch screen, an electronic stylus, image processing and gesture recognition devices, or any other type of input device. The input/output controller 2216 is in communication with an input/output device 2225. The input/output controller 2216 may provide output to a display, such as a computer monitor, a flat-panel display, a digital projector, a printer, a plotter, or other type of output device. The input/output controller 2216 may provide input communication with other devices such as a microphone, a speaker, game controllers and/or audio devices.

For example, the input/output controller 2216 can be an encoder and the input/output device 2225 can include a full speaker system having a plurality of speakers. The encoder can use a spatialization technology, and the encoder can process audio output audio or output signals received from the application 2222. The encoder can utilize a selected spatialization technology to generate a spatially encoded stream that appropriately renders to the input/output device 2225.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method for configuring multiple display devices, the method comprising:
    identifying a plurality of display devices that are to be combined to form an integrated rendering of a plurality of portions of display data;
    receiving, from one or more input sensors, a user input indicating a sequence of individual display devices of the plurality of display devices, the user input received from the one or more sensors without the use of a precision pointing device and a display configuration interface;
    determining a spatial arrangement of the display devices based on the user input indicating the sequence;
    receiving a subsequent user input confirming the spatial arrangement utilizing the one or more input sensors, wherein the user input includes at least a motion gesture;
    in response to the subsequent user input confirming the spatial arrangement, mapping portions of the display data to the display devices based on the spatial arrangement of the display devices; and
    rendering the mapped portions of the display data on the display devices to form an integrated display.

2. The method of claim 1, further comprising generating a prompt comprising a unique identifier on each of the display devices, wherein the user input is provided in response to the prompt.

3. The method of claim 1, wherein the one or more input sensors comprises touch-sensitive displays.

4. The method of claim 3, wherein the user input comprises a series of user touches to the touch-sensitive displays.

5. The method of claim 1, wherein the one or more input sensors comprises at least one camera.

6. The method of claim 5, wherein the input comprises a series of gestures that indicate at least one direction.

7. The method of claim 1, wherein the spatial arrangement comprises an ordering of each of the display devices in a grouping.

8. The method of claim 1, wherein the one or more input sensors comprises at least one audio input device and the user input comprises a series of voice commands.

9. The method of claim 1, wherein the spatial arrangement comprises an alignment of each of the display devices, wherein a confirmation of the alignment of each of the display devices in the spatial arrangement is requested using determined capabilities of each of the display devices.

10. The method of claim 1, further comprising rendering, on the display devices of the grouping, an indication of an order of each of the display devices.

11. A computing device, comprising:
    one or more processors; and
    a memory in communication with the one or more processors, the memory having computer-readable instructions stored thereupon that, when executed by the one or more processors, cause the computing device to perform operations comprising:
    identifying a set of display devices;
    rendering a user interface configured to prompt a user for input indicative of an ordering of the display devices;
    receiving, via the user interface, user input data indicative of the ordering of the display devices, the user input data received from one or more sensors without the use of a precision pointing device and a display configuration interface;
    translating the user input data to a spatial arrangement of the display devices, wherein a confirmation of a display device in the spatial arrangement is requested using determined capabilities of the display device;
    generating display data based on the spatial arrangement of the display devices and dimensional data for the display devices; and
    using the display data, rendering an integrated display on the display devices.

12. The computing device of claim 11, wherein the user interface comprises a touchscreen input, and the user input data comprises a series of touch inputs on successive ones of the display devices.

13. The computing device of claim 11, wherein the user interface comprises an optical input device, and the user input data comprises one or more gestures indicative of an ordering of the display devices.

14. The computing device of claim 11, wherein the generating display data comprises generating a display area including individual display areas of the arranged display devices.

15. The computing device of claim 11, wherein the user interface comprises an audio input device, and the user input data comprises one or more voice commands.

16. The computing device of claim 13, wherein the one or more gestures include a directional gesture indicative of the ordering of the display devices.

17. A computer-readable storage medium having computer-executable instructions stored thereupon which, when executed by one or more processors of a computing device, cause the computing device to:
    identify a grouping of devices that are to be combined to form a spatially integrated function;
    receive, from one or more sensors operable to receive input data from a user, data indicative of a desired arrangement of the devices, the input data received from the one or more sensors without the use of a precision pointing device and a display configuration interface;
    estimate, based on the input data, a spatial arrangement of the devices, wherein a confirmation of a display device in the spatial arrangement is requested using determined capabilities of the display device;
    based on the estimated spatial arrangement of the devices, apportion output data to the devices; and
    render the apportioned output data on the devices to form an integrated output.

18. The computer-readable storage medium of claim 17, wherein the devices are display devices that are spatially arranged to form an integrated display.

19. The computer-readable storage medium of claim 17, further comprising computer-executable instructions stored thereupon which, when executed by one or more processors of a computing device, cause the computing device to identify a second grouping of devices that are to be combined to form a second spatially integrated output.

20. The method of claim 1, further comprising: prompting a user for the subsequent user input confirming the spatial arrangement, wherein the subsequent user input includes user gestures in a desired sequence.

* * * * *